(12) United States Patent
Ridgway et al.

(10) Patent No.: US 8,098,185 B2
(45) Date of Patent: *Jan. 17, 2012

(54) MILLIMETER AND SUB-MILLIMETER WAVE PORTAL

(75) Inventors: Richard Ridgway, Westerville, OH (US); Philip Schofield, Upper Arlington, OH (US); Steven Risser, Reynoldsburg, OH (US)

(73) Assignee: Battelle Memorial Institute, Columbus, OH (US)

( * ) Notice: Subject to any disclaimer, the term of this patent is extended or adjusted under 35 U.S.C. 154(b) by 851 days.

This patent is subject to a terminal disclaimer.

(21) Appl. No.: 11/673,842

(22) Filed: Feb. 12, 2007

(65) Prior Publication Data
US 2008/0111735 A1 May 15, 2008

Related U.S. Application Data

(60) Provisional application No. 60/865,498, filed on Nov. 13, 2006.

(51) Int. Cl.
*G01S 13/00* (2006.01)
(52) U.S. Cl. ............. 342/22; 342/27; 342/175; 342/190
(58) Field of Classification Search .................... 342/22, 342/27, 175, 190
See application file for complete search history.

(56) References Cited

U.S. PATENT DOCUMENTS

| | | | |
|---|---|---|---|
| 4,185,172 A * | 1/1980 | Melindo et al. ............... 370/241 |
| 4,394,060 A | 7/1983 | Verber et al. |
| 4,770,483 A | 9/1988 | Ridgway |
| 4,789,840 A * | 12/1988 | Albin ............................ 329/354 |
| 4,839,709 A | 6/1989 | Zurakowski |
| 5,015,052 A | 5/1991 | Ridgway et al. |
| 5,087,982 A * | 2/1992 | Smothers ....................... 398/118 |
| 6,262,834 B1 * | 7/2001 | Nichols et al. ................ 359/301 |
| 6,317,094 B1 | 11/2001 | Wn et al. |
| 6,353,224 B1 * | 3/2002 | Sinclair et al. ............. 250/336.1 |
| 6,563,622 B2 | 5/2003 | Mueller et al. |
| 6,610,219 B2 | 8/2003 | McGinniss et al. |
| 6,687,425 B2 | 2/2004 | Ridgway et al. |
| 6,777,684 B1 | 8/2004 | Volkov et al. |
| 6,782,149 B2 | 8/2004 | Ridgway et al. |
| 6,785,435 B2 | 8/2004 | Ridgway et al. |
| 6,795,597 B2 | 9/2004 | Ridgway et al. |

(Continued)

FOREIGN PATENT DOCUMENTS
EP 0825733 A2 2/1998
(Continued)

OTHER PUBLICATIONS

Kawanishi et al, "Millimeter-wave generation and baseband modulation by using reciprocating optical modulation for radio-on-fiber systems in V-band", International Topical Meeting on Microwave Photonics, Sep. 10-12, 2003, pp. 325-328.

(Continued)

*Primary Examiner* — Timothy A Brainard
(74) *Attorney, Agent, or Firm* — Dinsmore & Shohl LLP

(57) ABSTRACT

In accordance with one embodiment of the present invention, a millimeter or sub-millimeter wave portal system is provided. Generally, the portal system comprises an electrooptic source and one or more millimeter or sub-millimeter wave detectors. The electrooptic source comprises an optical signal generator, optical switching and encoding circuitry, and one or more optical/electrical converters. Additional embodiments are disclosed and claimed.

24 Claims, 20 Drawing Sheets

U.S. PATENT DOCUMENTS

| | | | |
|---|---|---|---|
| 6,853,758 | B2 | 2/2005 | Ridgway et al. |
| 6,889,165 | B2 | 5/2005 | Lind et al. |
| 6,900,438 | B2 | 5/2005 | Vaidya et al. |
| 6,931,164 | B2 | 8/2005 | Risser et al. |
| 6,931,192 | B2 | 8/2005 | Ridgway et al. |
| 6,937,182 | B2 | 8/2005 | Lovberg et al. |
| 6,940,638 | B2 | 9/2005 | Kondoh et al. |
| 7,016,555 | B2 | 3/2006 | Ridgway et al. |
| 7,019,682 | B1 | 3/2006 | Louberg et al. |
| 7,092,643 | B2 | 8/2006 | Kajiya et al. |
| 7,099,359 | B2 | 8/2006 | Griffin |
| 7,127,181 | B2 * | 10/2006 | Gnauck et al. .............. 398/159 |
| 7,486,247 | B2 * | 2/2009 | Ridgway et al. ............. 343/767 |
| 7,783,199 | B2 * | 8/2010 | Ridgway et al. ............. 398/115 |
| 2002/0001116 | A1 | 1/2002 | Kajiya et al. |
| 2002/0030878 | A1 * | 3/2002 | Ohhiro ......................... 359/183 |
| 2002/0067747 | A1 | 6/2002 | Jalali et al. |
| 2002/0141027 | A1 | 10/2002 | LaGasse et al. |
| 2002/0149826 | A1 * | 10/2002 | Tanaka et al. ................ 359/181 |
| 2002/0181073 | A1 | 12/2002 | Kawanishi |
| 2003/0090767 | A1 | 5/2003 | Yap et al. |
| 2003/0128417 | A1 | 7/2003 | Kawanishi et al. |
| 2003/0189745 | A1 | 10/2003 | Kikuchi et al. |
| 2003/0231885 | A1 * | 12/2003 | Kato et al. ...................... 398/98 |
| 2004/0131303 | A1 | 7/2004 | Nippa et al. |
| 2004/0184694 | A1 | 9/2004 | Ridgway |
| 2004/0208644 | A1 | 10/2004 | Sirat et al. |
| 2005/0053324 | A1 | 3/2005 | Ridgway |
| 2005/0093733 | A1 | 5/2005 | Lovberg et al. |
| 2005/0110672 | A1 * | 5/2005 | Cardiasmenos et al. ........ 342/27 |
| 2005/0158050 | A1 | 7/2005 | Ridgway |
| 2005/0163503 | A1 * | 7/2005 | Lee et al. ........................ 398/19 |
| 2005/0226547 | A1 | 10/2005 | Ridgway |
| 2005/0230604 | A1 * | 10/2005 | Rowe et al. ................... 250/221 |
| 2005/0232459 | A1 * | 10/2005 | Rowe et al. ................... 382/100 |
| 2006/0017605 | A1 | 1/2006 | Lovberg et al. |
| 2006/0214107 | A1 * | 9/2006 | Mueller ....................... 250/341.8 |
| 2007/0019282 | A1 * | 1/2007 | Weiner et al. ................. 359/326 |
| 2007/0263907 | A1 * | 11/2007 | McMakin et al. ............ 382/115 |
| 2008/0023632 | A1 | 1/2008 | Ridgway et al. |
| 2008/0112705 | A1 | 5/2008 | Ridgway et al. |
| 2008/0146907 | A1 | 6/2008 | Koste |
| 2008/0199124 | A1 | 8/2008 | Nagatsuma et al. |
| 2008/0212968 | A1 | 9/2008 | Lindop et al. |
| 2009/0016729 | A1 | 1/2009 | Ridgway et al. |
| 2009/0289830 | A1 * | 11/2009 | Pergande et al. ............... 342/22 |

FOREIGN PATENT DOCUMENTS

| | | |
|---|---|---|
| EP | 1684448 A1 | 7/2006 |
| JP | 2004170245 A | 6/2004 |
| JP | 2004171647 A | 6/2004 |
| JP | 2004234118 A | 8/2004 |

OTHER PUBLICATIONS

International Search Report and Written Opinion dated Dec. 14, 2007 pertaining to International Application No. PCT/US2007/071658.

Kawanishi et al, Millimeter-wave generation and baseband modulation by using reciprocating optical modulation for radio-on-fiber systems in V-band, International Topical Meeting on Microwave Photonics, Sep. 10-12, 2003.

International Search Report and Written Opinion dated Jul. 23, 2009 pertaining to International application No. PCT/US2009-042532.

Suzaki Y. et al., "Monolithically integrated eight-channel WDM modulators with cyclic AWGs for multichannel-block operation over C-band", Electronics Letters, vol. 41, No. 9, Apr. 2005, pp. 551-552.

Pappert S.A. et al., "Tunable RF optical source using optical harmonic carrier generation", Proceedings of SPIE, vol. 3038, High-Speed Semiconductor Lasers for Communication, Norman S. Kwong; Radhakrishnan Nagarajan, Editors, Apr. 1997, pp. 89-96.

Amano K. et al., "Generation of 0.64-THz-Width Optical Sidebands by a Novel Electrooptic Modulator for the Purpose of Forming Ultrashort Optical Pulses," IEEE Journal of Lightwave Technology, vol. 5, No. 10, Oct. 1987, pp. 1454-1458.

Guo F. et al., "Quasi-Velocity-Matched Electrooptic Phase Modulator for the Synthesis of Ultrashort Optical Pulses," IEEE Journal of Quantum Electronics, vol. 33, No. 5, May 1997, pp. 879-882.

Shi Y. et al., "High-Speed Electrooptic Modulator Characterization Using Optical Spectrum Analysis," IEEE Journal of Lightwave Technology, vol. 21, No. 10, Oct. 2003, pp. 2358-2367.

Hisatake S. et al., "Generation of flat power-envelope terahertz-wide modulation sidebands from a continuous-wave laser based on an external electro-optic phase modulator," Optics Letters, vol. 30, No. 7, Apr. 2005, pp. 777-779.

Hirata A. et al., "120-GHz Wireless Link Using Photonic Techniques for Generation, Modulation, and Emission of Millimeter-Wave Signals," IEEE Journal of Lightwave Technology, vol. 21, No. 10, Oct. 2003, pp. 2145-2153.

Kawanishi T. et al., "Direct measurement of chirp parameters of high-speed Mach-Zehnder-type optical modulators," Optics Communications, vol. 195, Aug. 2001, pp. 399-404.

Hodgkinson et al., "Comparison of sinusoidal and pulse modulation techniques for generating optical frequency reference combs," Electronics Letters, vol. 25, No. 8, Apr. 1989, pp. 509-510.

Auracher F. et al., "Method for measuring the rf modulation characteristics of Mach-Zehnder-type modulators," Applied Physics Letters, vol. 36, No. 8, Apr. 1980, pp. 626-629.

Kitayama K., "Highly Stabilized Millimeter-Wave Generation by Using Fiber-Optic Frequency-Tunable Comb Generator," IEEE Journal of Lighwave Technology, vol. 15, No. 5, May 1997, pp. 883-893.

Hirata A. et al., "Low-Phase Noise Photonic Millimeter-Wave Generator Using an AWG Integrated with a 3-dB Combiner," IEICE Trans. Electron, vol. E88-C, No. 7, Jul. 2005, pp. 1458-1464.

Suzuki H. et al., "Photonic millimetre-wave generator using intensity and phase modulators for 10 Gbit/s wireless link," Electronics Letters, vol. 41, No. 6, Mar. 2005, pp. 355-356.

Hirata A. et al., "120-GHz-Band Millimeter-Wave Photonic Wireless Link for 10-Gb/s Data Transmission," IEEE Transactions on Microwave Theory and Techniques, vol. 54, No. 5, May 2006, pp. 1937-1944.

Office Action dated Sep. 3, 2008 pertaining to U.S. Appl. No. 11/381,618.

Office Action dated May 27, 2009 pertaining to U.S. Appl. No. 11/774,132.

Office Action dated Apr. 1, 2009 pertaining to U.S. Appl. No. 11/381,618.

Office Action dated Sep. 2, 2009 pertaining to U.S. Appl. No. 11/381,618.

Office Action dated Nov. 25, 2009 pertaining to U.S. Appl. No. 11/774,132.

Office Action dated Jan. 14, 2010 pertaining to U.S. Appl. No. 11/673,833.

\* cited by examiner

MILLIMETER AND SUB-MILLIMETER WAVE PORTAL

CROSS-REFERENCE TO RELATED APPLICATIONS

This application claims the benefit of U.S. Provisional Application Ser. No. 60/865,498, filed Nov. 13, 2006. The present application is also related to commonly assigned U.S. patent application Ser. No. 11/673,833, which application has been filed concurrently herewith.

BRIEF SUMMARY OF THE INVENTION

The present invention relates to the utilization of millimeter and sub-millimeter waves to sense, identify, locate, image, or otherwise detect objects within a field of view. More specifically, the present invention relates to the design of a portal system that utilizes millimeter and sub-millimeter waves to detect the presence of particular types of objects passing through one or more portals. In accordance with one embodiment of the present invention, a millimeter or sub-millimeter wave portal system is provided. Generally, the portal system comprises an electrooptic source and one or more millimeter or sub-millimeter wave detectors. The electrooptic source comprises an optical signal generator, optical switching and encoding circuitry, and one or more optical/electrical converters. Additional embodiments are disclosed and claimed.

The present invention also relates to the design and operation of a frequency selective electrooptic source having utility beyond the aforementioned security portal embodiments. In accordance with one embodiment of the present invention, the electrooptic source comprises an optical signal generator, optical circuitry, and at least one optical/electrical converter wherein the optical signal generator comprises a plurality of optical outputs characterized by distinct output frequencies and the optical circuitry is configured to permit the selection and combination of different ones of the distinct-frequency optical outputs to generate a modulated optical signal, which is converted to a millimeter or sub-millimeter wave.

BRIEF DESCRIPTION OF THE SEVERAL VIEWS OF THE DRAWINGS

The following detailed description of specific embodiments of the present invention can be best understood when read in conjunction with the following drawings, in which.

DETAILED DESCRIPTION

Figure 1:
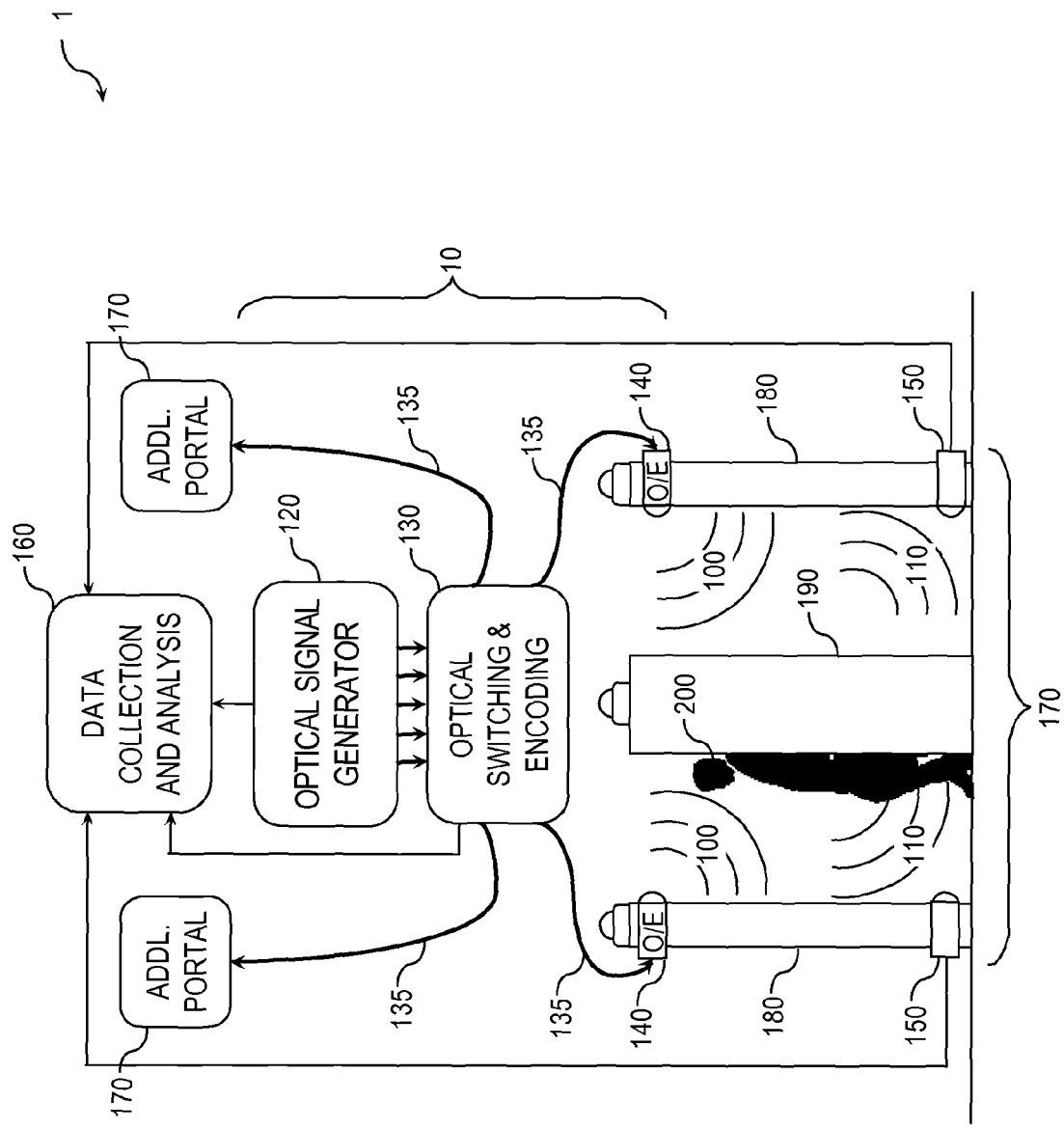
FIG. 1 is a schematic illustration of a millimeter or sub-millimeter wave portal system according to one embodiment of the present invention.

A schematic illustration of a millimeter or sub-millimeter wave portal system 1 according to one embodiment of the present invention is illustrated in FIG. 1. Generally, the portal system 1 comprises an electrooptic source 10 and one or more millimeter or sub-millimeter wave detectors 150. The electrooptic source comprises an optical signal generator 120, optical switching and encoding circuitry 130, and one or more optical/electrical converters 140.

For the purposes of describing and defining the present invention, it is noted that reference herein to millimeter and sub-millimeter wave signals denote frequencies that are $\geq 30$ GHz. The optical signal generator 120 is configured to generate a modulated optical signal characterized by a modulation frequency of at least about 30 GHz. The optical circuitry is configured to direct the modulated optical signal to one or more optical/electrical converters 140 via optical fibers, waveguides, or other suitable optical transmission lines 135. Each optical/electrical converter 140 is configured to convert the modulated optical signal to a millimeter or sub-millimeter wave 100 and direct the millimeter or sub-millimeter wave 100 in the direction of an object 200 positioned within a field-of-view defined by one of the millimeter or sub-millimeter wave detectors 150. Each millimeter or sub-millimeter wave detector 150 is configured to convert reflections 110 of the millimeter or sub-millimeter wave from the object 200 to signals representing attenuation of the millimeter or sub-millimeter wave 100 upon reflection from the object 200.

A variety of analysis schemes can be applied to the signals representing the attenuation of the millimeter or sub-millimeter wave 100 upon reflection from the object 200 to determine whether a particular item of interest is present in or carried on the object 200. The details of these schemes can be gleaned from conventional or yet to be developed teachings related to millimeter or sub-millimeter wave detection. For example, and not by way of limitation, metallic or non-metallic objects concealed beneath clothing can be observed using millimeter wave (mmw) imaging by correlating the attenuation with the frequency-dependent attenuation or reflectivity of common materials like flannel, polyester, cotton, nylon, polycarbonate, human skin, etc.

In one embodiment of the present invention, if a mmw image is taken of a person at a given frequency, the expected image of that same person at a different frequency can be reasonably well approximated, based solely on the frequency dependence of the reflectivity of human skin. If the person is carrying a concealed object, the expected image of that person at a second frequency will differ from the expected image, due to the different reflectivity of the concealed object. This deviation between the expected image and measured image at the alternate frequency can be used to indicate the presence of a concealed object without human interpretation of the image. Although the present invention is not limited to the use of multiple mmw frequencies, the use of more than two frequencies in the portal system of the present invention can reduce the number of false positives without sacrificing the ability to detect concealed objects. For example, because the total reflected power at a given frequency depends on the size and shape of the target as well as clothing worn and any concealed objects, the system can be configured to be self-calibrating by programming the data collection and analysis unit 160 to compare attenuation in the reflected signal at multiple frequencies. The size and shape of the object 20 as well as the clothing composition can be removed as variables, by comparing the response of the target object 200 at the appropriate frequencies, leaving only the presence of a concealed object to change the reflectance from the expected frequency-dependent response.

The determination of the potential presence of a concealed object is performed by the data collection and analysis unit 160. It is envisioned that the multiple mmw security portals being served by the single mmw waveform generator may have a common data analysis unit 160. The presence of a potential concealed object can then be signaled at the proper portal by a "beep" or other indicator, such as occurs with existing magnetometers. Alternatively, mmw portals according to the present invention can be equipped with an array of detectors 150 configured to generate an image of the object 200, in which case suitable image processing software would need to be incorporated in the data collection and analysis unit 160.

Typically, the field-of-view defined by the millimeter or sub-millimeter wave detectors 150 is such that the object 200 cannot pass through or near a portal 170 of the portal system 100 without also passing through the field-of-view of a detector 150. In the illustrated embodiment, the portal 160 is configured as a walk-through portal including a pair of millimeter or sub-millimeter wave components 180 and a supplemental detection component 190 operating as a conventional metal detector, or another type of conventional or yet to be developed detector or imaging device suitable for use in a portal system. For the purposes of defining and describing the present invention, it is noted that reference herein to a "portal" should be taken to cover a variety of structures or configurations suitable for object analysis including, but not limited to, a doorway, gateway, entry, threshold, portico, station, terminal, passage, etc.

Although the optical signal generator 120 may take a variety of conventional or yet to be developed forms suitable for generating a modulated optical signal, according to one embodiment of the present invention, the generator 120 comprises an electrooptic sideband generator 20 and an optical filter 30, the structure of which is described in detail below with reference to FIGS. 2-11. As is described below with reference to FIGS. 2-11, in the case of the embodiment of the present invention illustrated in FIGS. 2A and 2B, where an arrayed waveguide grating (AWG) is employed as the optical filter 30, each of the outputs of the generator 120 will carry a distinct optical frequency because the AWG comprises multiple frequency channels, each of which is characterized by a unique, relatively narrow bandwidth.

For example, in the case of a 25 GHz AWG, each output channel of the AWG has a 3 dB bandwidth of about 25 GHz and is separated from adjacent channels by 25 GHz. Accordingly, referring generally to the AWG structure illustrated in FIG. 6, which is described in detail below, the output channel passing unmodulated light is designated as the center channel and each additional port is assigned a +/− port number denoting the sequential frequency separation of the port from the center channel. In the case of the 25 GHz AWG, the center wavelength of the first port on the high frequency side of the center channel (port P1$^+$) will be 25 GHz above that of the center channel (P0), while the center wavelength of the first port on the low frequency side of the center channel (port P1$^-$) will be 25 GHz below that of the center channel (P0). Since port P1$^+$ has a 3 dB bandwidth of 25 GHz, this channel would pass wavelengths from $\lambda_0$+12.5 GHz to $\lambda_0$+37.5 GHz, where $\lambda_0$ represents the wavelength of the center channel. Similarly, the center wavelength of the second port on the high frequency side of the center channel (port P2$^+$) will be 50 GHz above that of the center channel (P0), while the center wavelength of the second port on the low frequency side of the center channel (port P2$^-$) will be 50 GHz below that of the center channel (P0). Since port P2$^+$ also has a 3 dB bandwidth of 25 GHz, this channel would pass wavelengths from $\lambda_0$+37.5 GHz to $\lambda_0$+62.5 GHz. Accordingly, the distinct frequencies created by the sideband generator need not match the specific center wavelengths of the AWG channels. Rather, the design of the AWG and the configuration of the sideband generator merely need to result in a configuration where the distinct frequencies created by the sideband generator are passed through separate ones of the AWG channels.

Figure 2A:
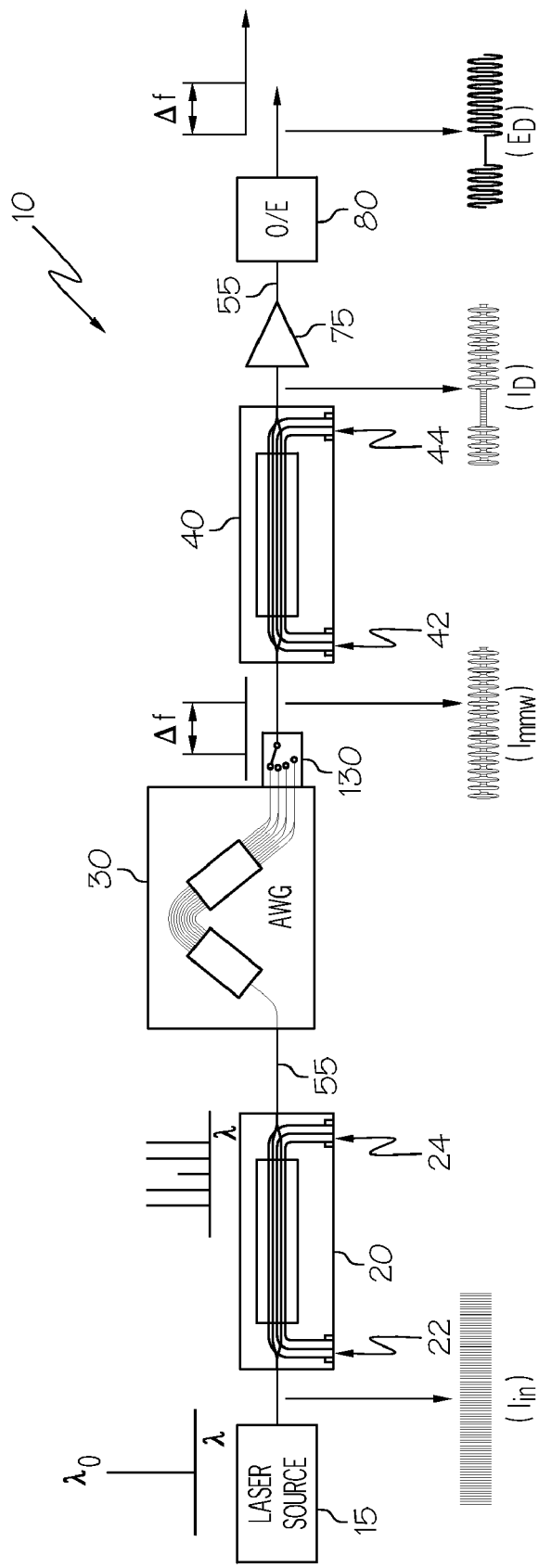
FIG. 2A is a schematic illustration of an electrooptic source according to one embodiment of the present invention.
Figure 2B:
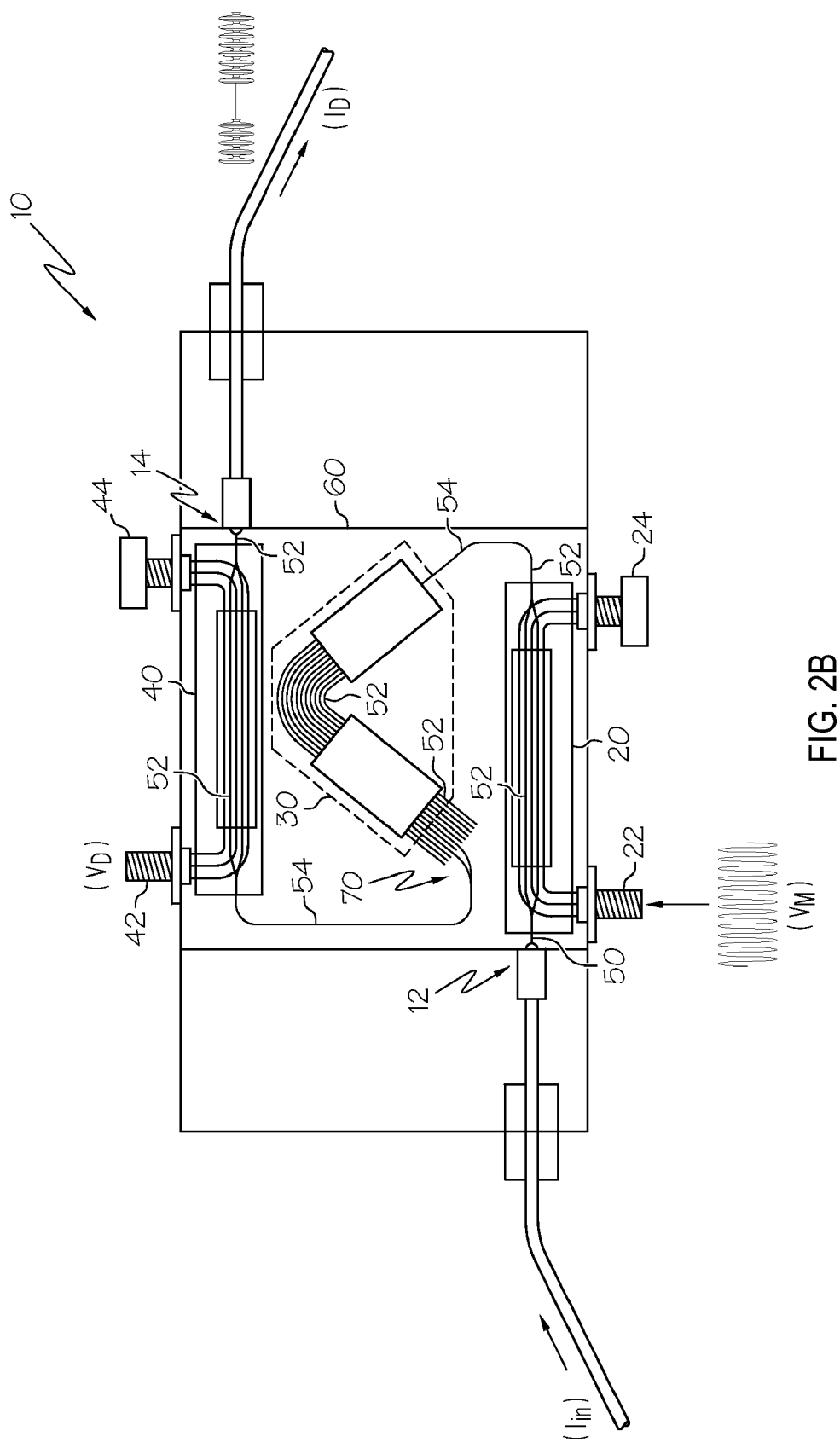
FIG. 2B is a schematic illustration of an electrooptic source according to an embodiment of the present invention in the context of a planar lightwave circuit.
Figure 2C:
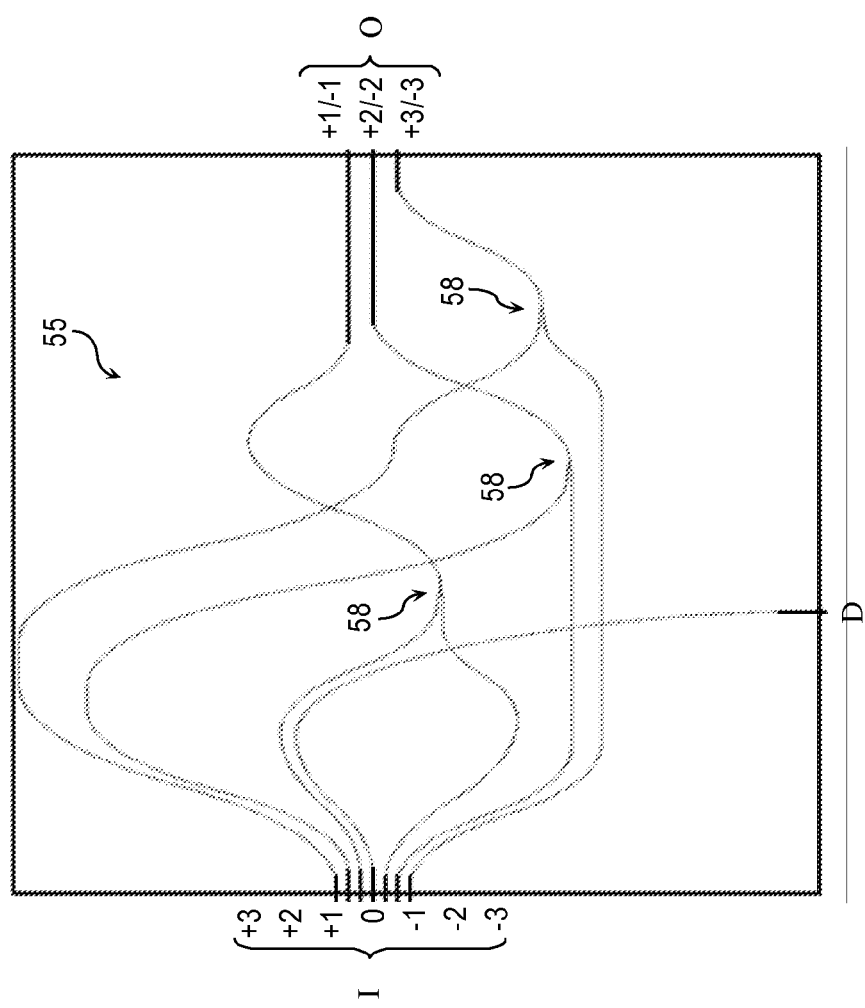
FIG. 2C is a skewed schematic illustration of a waveguide configuration according to one embodiment of the present invention.

In FIG. 2C, a plurality of waveguides 55 and optical couplers 58 are formed on a waveguide substrate to define a series of input channels I suitable for coupling to the output channels of the AWG, and a series of output channels O configured to transmit respective signal pairs combined by the optical couplers 58. In the illustrated configuration, the center channel signal is directed to a suitable optical dump D while the first, second, and third order sidebands are combined and directed to the output channels O. These combined MMW optical carriers can be directed to additional optical switching circuitry to ensure that the correct carrier is encoded and/or directed to the suitable O/E converters for transmission of MMW signals.

Figure 2D:
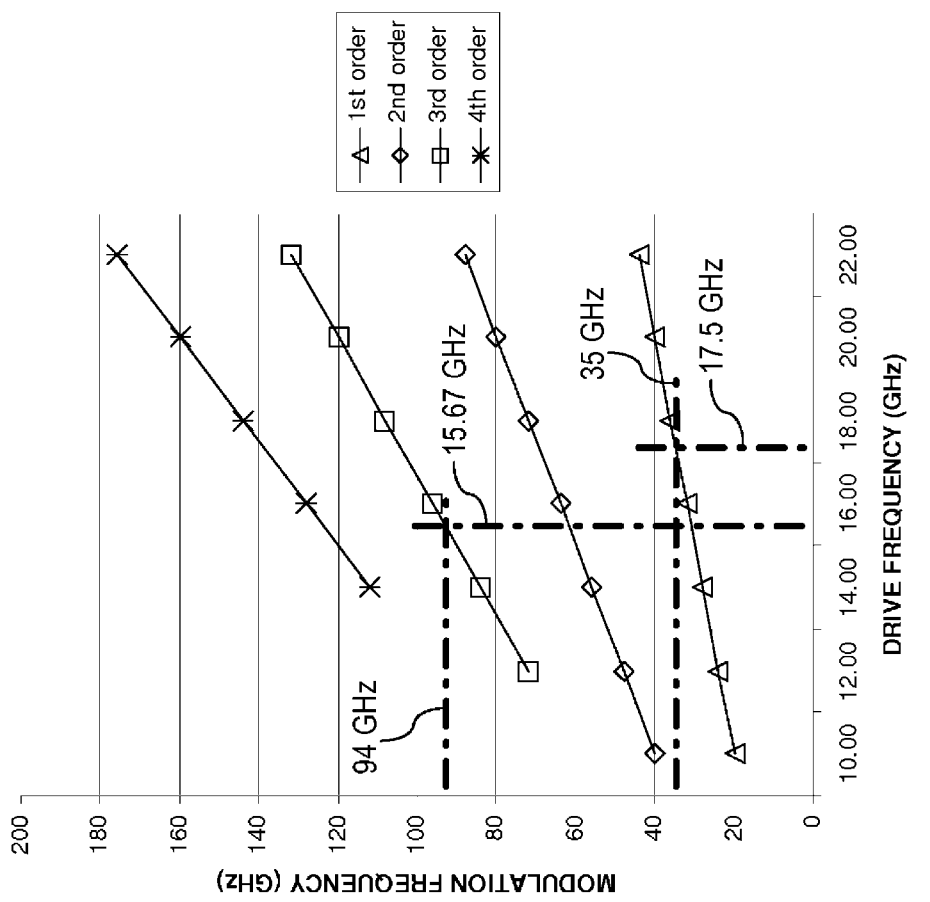
FIG. 2D is a graphic illustration of an operating mode of an electrooptic source according to one embodiment of the present invention.

An example of the manner in which the optical signal generator 120 can be driven is illustrated in the table below and in FIG. 2D. The optical signal generator 120 can be driven at, e.g., 17.5 GHz, to generate first order sidebands spaced apart from each other by about 35 GHz. More specifically, by definition, each first order sideband is spaced from the drive signal by 17.5 GHz and, as such, the first order side bands are spaced from each other by twice that amount, i.e., 35 GHz. Each of these first order sidebands is directed to distinct generator outputs by the optical filter 30 and can be selectively combined by the switching circuitry 130 to yield continuous-wave Ka-band optical modulation at 35 GHz. Selection and combination of second, third, or fourth order sidebands of the 17.5 GHz drive frequency would yield optical modulation of 70 GHz (V-band), 105 GHz (W-band), and 140 GHz (F-band), respectively. This linear relationship is illustrated in FIG. 2D for the first, second, third, and fourth-order side bands over a drive frequency range extending from about 10 GHz to about 22 GHz.

waveguides may cross in the manner illustrated in FIG. 2C, as long as the respective crossing angles are reasonably large to avoid optical interference.

In cases where the sideband generator 20 is merely driven hard enough to create a limited number of prominent sidebands, the center wavelength of the laser source 15 can be tuned to enhance frequency selection. For example, consider the case where the sideband generator merely creates prominent first and third order sidebands. If the wavelength of the laser source 15 is tuned the center channel of the AWG, the waveguide network 55 will generate only two frequency distinct MMW carrier signals, one corresponding to the +/−1 sidebands, and the other to the +/−3 sidebands. If the preferred MMW carrier signal actually corresponds to the +/−2 sidebands, the wavelength of the laser can be tuned such that it shifts to the +1 channel of the AWG and the +1 input channel of the waveguide network 55. As a result, the waveguide network 55 and optical couplers 58 would combine the signals residing on the −3/+1 channels and generate a MMW carrier corresponding to the −3/+1 sidebands, which would be the equivalent of a combination of the +/−2 sidebands.

|  | Ka Band Operation | W-Band Operation | F-Band Operation |
| --- | --- | --- | --- |
| MMW Carrier Frequency | 35 GHz | 94 GHz | 140 GHz |
| Drive Frequency | 17.5 GHz | 15.67 GHz | 17.5 GHz |
| Sidebands Used | +/−1 | +/−3 | +/−4 |
| Sideband Wavelengths | $\lambda_0$ + 17.5 GHz<br>$\lambda_0$ − 17.5 GHz | $\lambda_0$ + 47 GHz<br>$\lambda_0$ − 47 GHz | $\lambda_0$ + 70 GHz<br>$\lambda_0$ − 70 GHz |
| AWG Ports Used (25 GHz AWG) | P1$^+$ ($\lambda_0$ + 12.5 GHz to $\lambda_0$ + 37.5 GHz)<br>P1$^-$ ($\lambda_0$ − 12.5 GHz to $\lambda_0$ − 37.5 GHz) | P2$^+$ ($\lambda_0$ + 37.5 GHz to $\lambda_0$ + 62.5 GHz)<br>P2$^-$ ($\lambda_0$ − 37.5 GHz to $\lambda_0$ − 62.5 GHz) | P3$^+$ ($\lambda_0$ + 62.5 GHz to $\lambda_0$ + 87.5 GHz)<br>P3$^-$ ($\lambda_0$ − 62.5 GHz to $\lambda_0$ − 87.5 GHz) |

The sideband generation and illustrated in FIGS. 2C and 2D, and in the table above, merely involves the combination of like order sidebands, e.g., +/−1, +/−3, +/−4 etc. However, it is contemplated that the optical circuitry 130 can be configured to select and combine different ones of the distinct-frequency optical outputs to yield a variety of distinct, continuous-wave, modulated optical signal outputs. For example, according to one embodiment of the present invention, a series of waveguides and waveguide combiners can be formed on a single waveguide substrate and can be configured to facilitate selection and combination of distinct-frequency optical outputs from different order sidebands, e.g., +4/0, +1/−2; −3/−5, etc. As a result, the optical signal generator 120 and optical circuitry according to this embodiment of the present invention cooperate to introduce frequency selection capabilities in the electrooptic source 10.

The crossing waveguide configuration illustrated in FIG. 2C is particularly useful where a tri-band electrooptic source is desired. Specifically, if the sideband generator 20 illustrated in FIG. 2A is driven hard enough, each of the input channels I of the crossing waveguide configuration illustrated in FIG. 2C will carry a distinct sideband. These distinct sidebands can be combined as dictated by the configuration of the waveguides 55 and the optical couplers 58 to yield three frequency distinct MMW carrier signals, each of which can be transmitted via a separate output channel O. It is noted that the scale of FIG. 2C has been skewed to provide increased separation between the respective waveguides 55. In addition, the configuration of the respective optical couplers is merely illustrated schematically. Finally, we note that the Wavelength selection can also be achieved by varying the drive frequency of the sideband generator. For example, as is further illustrated in the table above and in FIG. 2D, the optical signal generator 120 can be driven at, e.g., 15.67 GHz, to generate third order sidebands spaced apart from each other by about 94 GHz. Each of these sidebands is directed to distinct generator outputs by the optical filter 30 and can be selectively combined by the switching circuitry 130 to yield continuous-wave optical modulation in the W-band, i.e., at 94 GHz.

Accordingly, as is illustrated in FIG. 2D, the signal generator and switching circuitry of this aspect of the present invention can be operatively coupled to a programmable controller or other suitable control hardware to provide an effective means of controlling the modulation frequency of the electrooptic source 10 over a wide range. The source 10 may be scanned through a plurality of modulation bands or across a broad frequency range in a substantially continuous manner by controlling the drive frequency and selecting/combining suitable sidebands to yield a desired modulation frequency. It is contemplated that a frequency-scanned optical output or different combinations of distinct-frequency optical outputs can be directed to a common optical/electrical converter 140, a plurality of different optical/electrical converters 140, or both. It is further contemplated that modulated optical signals can be directed to a single optical/electrical converter 140 at a single portal 170, to a plurality of optical/electrical converters in a single portal, or to a plurality of optical/electrical converters 140 distributed across several portals 170. The optical circuitry 130 can be configured to do so by splitting the modulated optical signal into a plurality of modulated outputs, by redirecting the modulated optical signal sequentially from one optical/electrical converter 140 to the next, or both.

The optical circuitry 130 can also be configured to encode the modulated optical signal prior to direction to an optical/electrical converter 140. For example, once the modulated optical signal has been established, a tone or digital signature can be incorporated on the optical carrier by utilizing, for example, the data encoder described in detail below with reference to FIGS. 2A, 2B and 7. Since it is generally easier to modulate an optical signal than to modulate a THz signal, the tone or digital signature is encoded onto the signal in the optical domain. A relatively simple modulator configured as a Mach-Zehnder interferometer can be used to encode the tone or digital signature. It is contemplated that alternative means may be employed to modulate the optical signal in the optical or electrical domain without departing from the scope of the present invention.

Once the tone or digital signature is encoded onto the modulated optical signal, the composite signal can optionally be amplified. The optical amplification is relatively straight forward. Optical amplifiers, such as Erbium-doped fiber amplifiers will increase optical power without excessive loss of data modulation on the optical signal. After the potential amplification, the optical signal then is switched or split, to send the signal to the various mmw emitters at the various mmw security portals. Optionally, amplification of the optical signal can occur after the switching or splitting of the optical signal.

Although the detectors 150 may take a variety of conventional or yet to be developed forms suitable for converting the reflected mmw signals to signals representing the attenuation of the millimeter or sub-millimeter wave 100 upon reflection from the object 200, according to one embodiment of the present invention, the detector 150 comprises an antenna assembly comprising a tapered slot antenna portion 20' and an electrooptic waveguide portion 30', the structure of which is described in detail below with reference to FIGS. 12-19.

Referring collectively to FIGS. 2-11 and initially to FIG. 2A, an electrooptic source 10 suitable for use in security portals according to some embodiments of the present invention is illustrated. Generally, the illustrated electrooptic source 10 comprises, among other things, a sideband generator 20, an optical filter 30, and a waveguide network 55 configured to direct an optical signal from an optical input 12 of the electrooptic source 10 through the sideband generator 20 and the optical filter 30 to an optical output 14 of the electrooptic source 10. As will be discussed in greater detail with reference to FIGS. 3-5 below, the sideband generator 20 is configured to generate frequency sidebands S about a carrier frequency $\lambda_0$ of the input optical signal $I_{IN}$. The optical filter 30 is configured to discriminate between the frequency sidebands S and the carrier frequency $\lambda_0$ so as to direct particular sidebands of interest to the optical output 14 in the form of a millimeter wave optical signal $I_{MMW}$. Where data-encoded modulation of the output signal is desired, the electrooptic source 10 further comprises a data encoder 40 configured generate an encoded optical data signal $I_D$.

The sideband generator 20 can be configured as an electrooptic interferometer. More specifically as a Mach-Zehnder interferometer where an optical signals propagating in the input segment of the interferometer is divided into two equal parts at, e.g., a Y-splitter. The two optical signals propagate down the two arms of the interferometer before being recombined with, e.g., a Y-combiner. If the two optical signals are in phase at the Y-combiner, the signals constructively interfere and the full intensity propagates out the output waveguide. If, however, the two optical signals are out of phase, then the signals destructively interfere and the output intensity is reduced. If the signals at the Y-combiner are out of phase by π radians, then the two signals will destructively interfere and the output will be at a minimum.

For an electrooptically-controlled Mach-Zehnder interferometer, for example, a 12 GHz voltage applied to the electrooptic waveguides via, a modulation signal input terminal 22 and a 50Ω control signal termination 24, will induce a phase shift that will adjust the constructive and destructive interference at the signal combiner. When the voltage applied to the electrooptic waveguides induces a π phase shift between the two arms, the output will be minimized. The voltage that induces the π phase is known as Vπ. By way of illustration and not limitation, specific teachings on some suitable control electrode and waveguide configurations for use in the sideband generator 20 and data encoder 40 of the present invention are presented in U.S. PG Pub. Nos. 2005/0226547 A1 for Electrooptic Modulator Employing DC Coupled Electrodes and 2004/0184694 A1 for Electrooptic Modulators and Waveguide Devices Incorporating the Same.

When the electrooptic interferometer is biased at $-\pi/2$ and is modulated at a frequency of $f_m$ (note: $\omega m = 2\pi f_m$), then the magnitude of the output optical signal at the fundamental frequency and at each of the odd harmonics (i.e. $3\omega_m, 5\omega_m, \ldots$) can be calculated using Bessel functions. Table 1 summarizes the magnitude of the fundamental and odd harmonics.

| | Peak-to-Peak | Amplitude of Harmonic | | | |
|---|---|---|---|---|---|
| Drive Voltage ($V_m$) | Voltage | $\omega_m$ | $3\omega_m$ | $5\omega_m$ | $7\omega_m$ |
| $V_\pi/4$ | $V_\pi/2$ | 0.363 | 0.009 | 7.5e−5 | 2.8e−7 |
| $V_\pi/2$ | $V_\pi$ | 0.567 | 0.069 | 0.0022 | 3.4e−5 |
| $V_\pi$ | $2V_\pi$ | 0.285 | 0.333 | 0.052 | 0.003 |
| $2V_\pi$ | $4V_\pi$ | −0.212 | 0.029 | 0.373 | 0.157 |

Figure 3A:
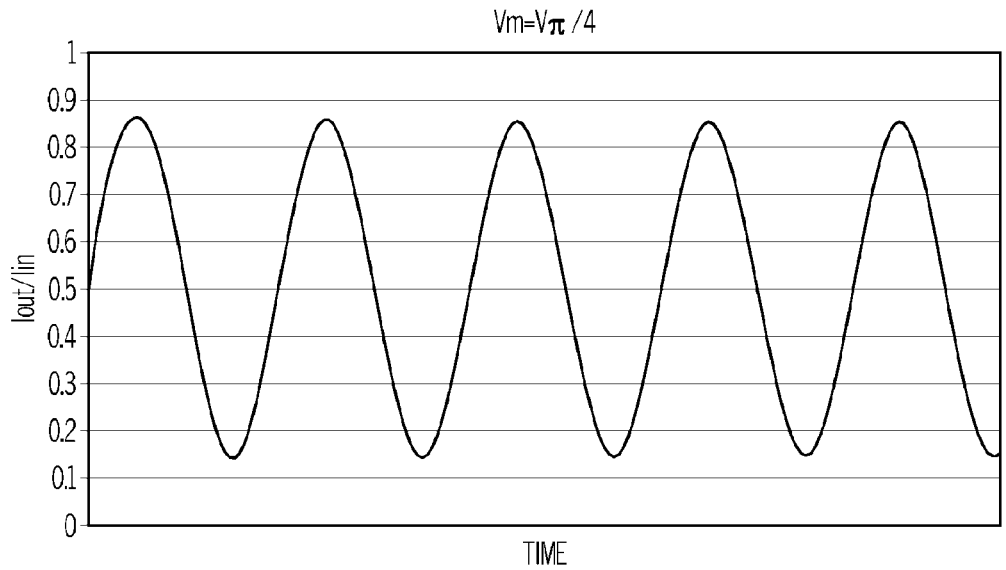
FIGS. 3A-3D are graphic illustrations of the time-domain response of a sideband generator according to one embodiment of the present invention with drive voltage amplitudes equal to $V_\pi/4$, $V_\pi/2$, $V_\pi$, and $2V_\pi$.
Figure 3B:
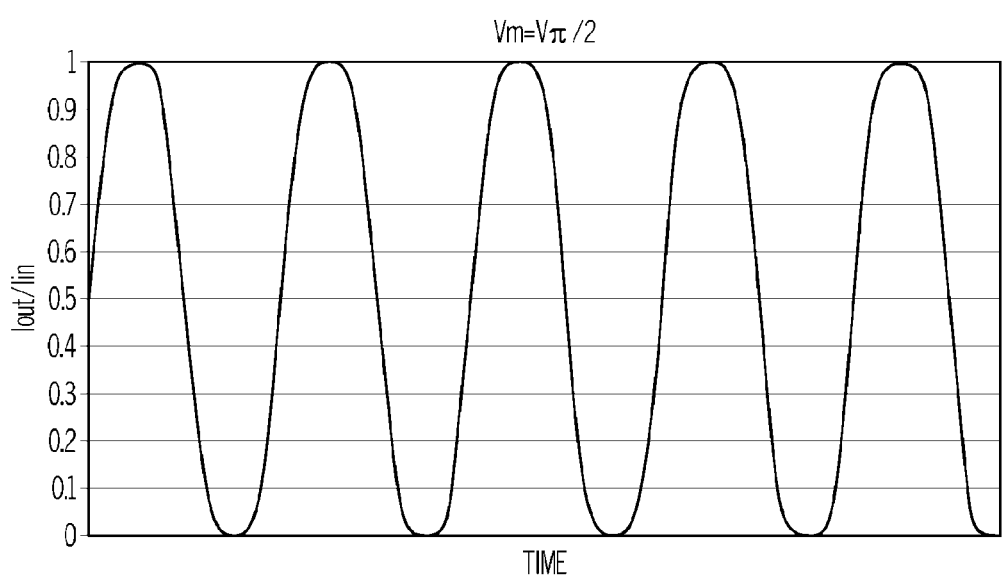
Figure 3C:
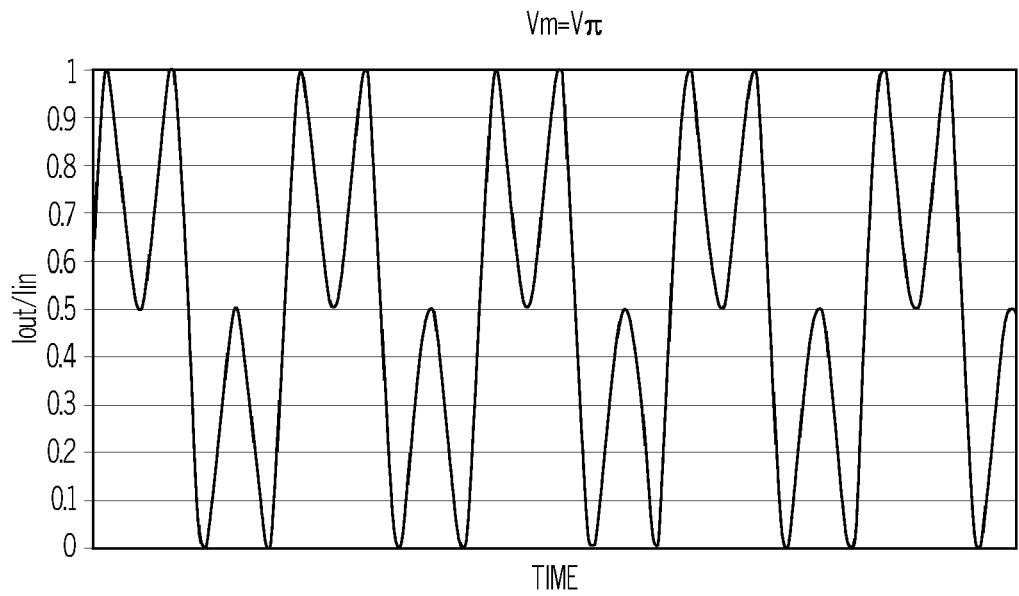
Figure 3D:
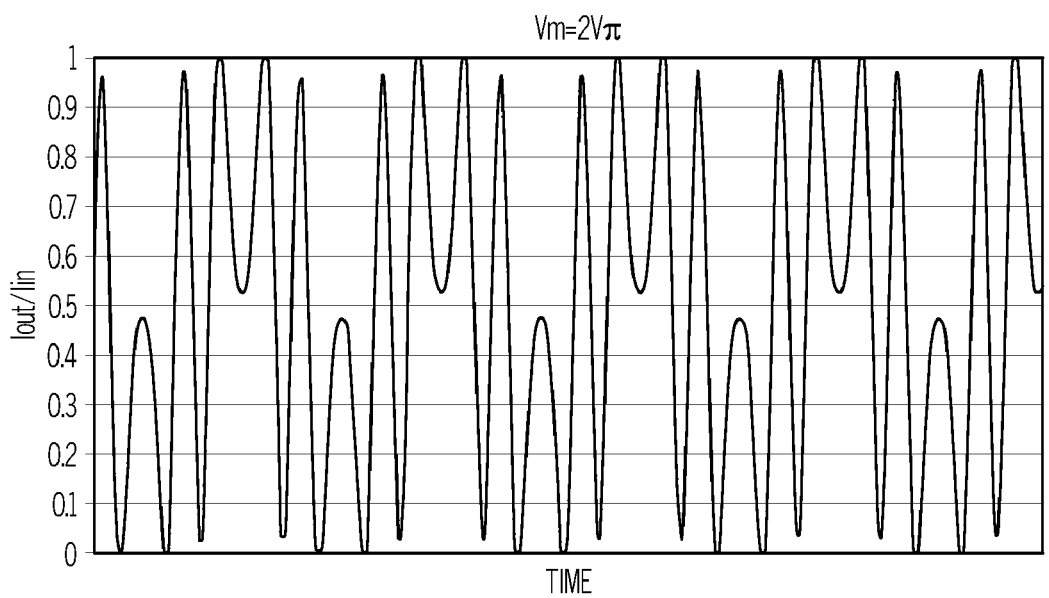

From Table 1, we can see that if the modulator is driven with a voltage less than $V_\pi$, then the amplitude of the harmonics is quite low. However, as the modulator gets driven harder, the magnitude of the harmonics becomes larger than the fundamental. FIGS. 3A-3D show the time-domain response of the interferometer with drive voltage amplitudes equal to $V_\pi/4, V_\pi/2, V_\pi$, and $2V_\pi$. The odd harmonic $3\omega_m$ dominates the carrier frequency $\omega_m$ in FIG. 3C. In FIG. 3D, the odd harmonic $5\omega_m$ dominates the carrier frequency $\omega_m$.

Figure 4:
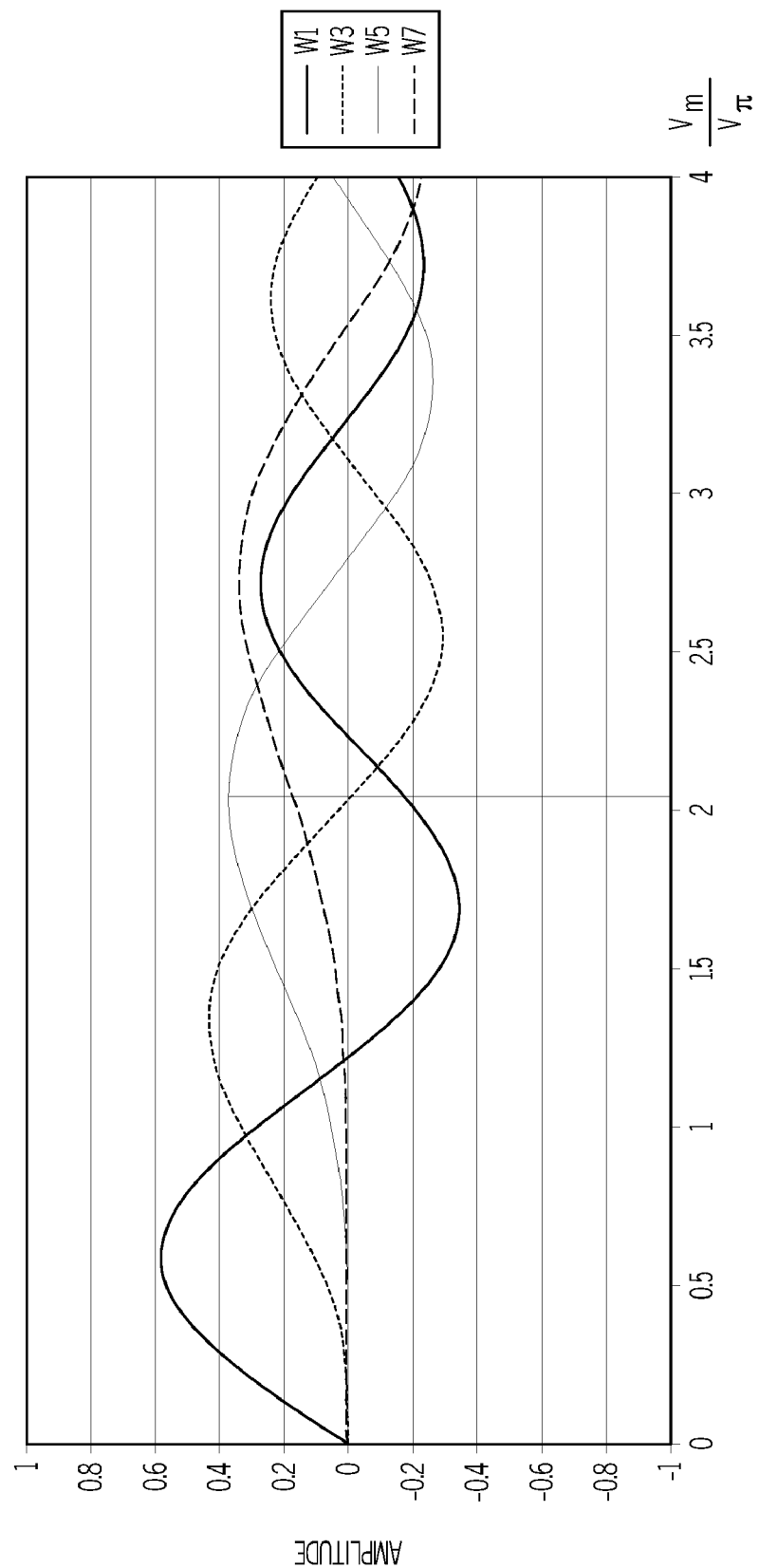
FIG. 4 is a graphic illustration of the relationship between the amplitude of the odd numbered harmonics and the normalized drive voltage, $V_m/V_\pi$ in the context of a sideband generator according to one embodiment of the present invention.

FIG. 4 graphically shows the relationship between the amplitude of the fundamental, third, fifth, and seventh harmonics and the normalized drive voltage, $V_m/V_\pi$. As can be seen from FIG. 4, if the electrooptic modulator functioning as the sideband generator 20 is driven with a voltage amplitude a little larger than $2V_\pi$, then the amplitude of the fifth harmonic (W5) will be maximum. Regardless of which sideband is selected as the sideband of interest, it is contemplated that the control signal can be selected such that it approximates a sinusoidal voltage where the amplitude of the sideband of interest reaches a maximum.

Figure 5A:
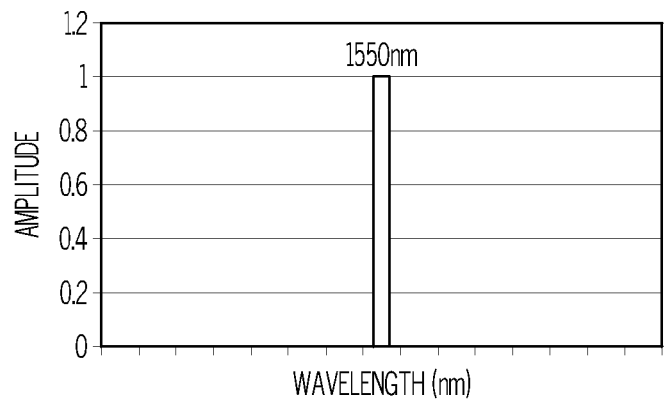
FIGS. 5A-5C are graphic illustrations of an unmodulated optical signal and an optical spectrum at the output of a sideband generator according to an embodiment of the present invention with $V_m=V\pi$ and $V_m=2V\pi$.
Figure 5B:
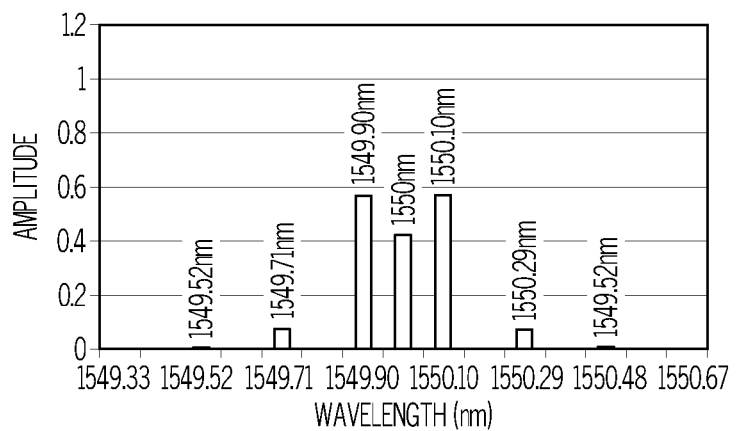
Figure 5C:
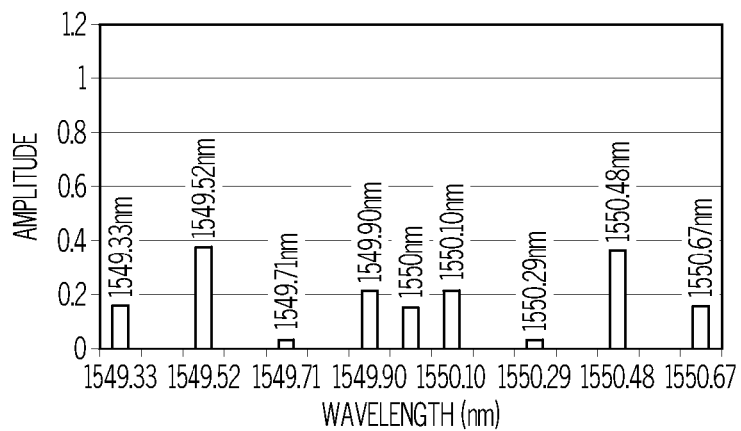

Referring to FIGS. 5A-5C, given the example where a 1550 nm optical signal is modulated at 10 GHz, the fundamental modulation frequency and any harmonics will be present as sidebands on the optical carrier at +/−0.08 nm from the 1550 nm carrier. FIG. 5A shows an unmodulated optical signal. FIG. 5B shows the optical spectrum at the output of the sideband generator 20 with $V_m = V\pi$. FIG. 5C shows the spectrum with $V_m=2V\pi$. The optical spectrum in FIG. 5C shows dominant sidebands at 1549.52 nm and 1550.48 nm. In the frequency domain, these wavelengths correspond to 193,608.4 GHz and 193,488.4 GHz, respectively. The difference between these two frequencies is 120 GHz. Again, this corresponds to +/− the fifth harmonic of the 12 GHz modulation frequency (i.e. +/−5*12 GHz or +/−60 GHz).

It is contemplated that the sidebands of interest need not dominate the optical signal output from the sideband generator 20. Rather, in many embodiments of the present invention, it may be sufficient to merely ensure that the magnitude of the frequency sidebands of interest, at an output of the sideband generator, is at least about 10% of a magnitude of the optical carrier signal at the optical input of the electrooptic source.

Regarding the optical filter 30, as is noted above, the purpose of the optical filter 30 is to select the desired sidebands and remove the carrier frequency and any unwanted sidebands. This optical filtering function can be accomplished using a variety of technologies, including Bragg grating reflective filters, wavelength-selective Mach-Zehnder filters, multilayer thin film optical filters, arrayed waveguide gratings (AWG), micro ring resonator filters, and directional coupler filters that are wavelength selective. An arrayed waveguide grating is particularly useful because it is an integrated optical device with multiple channels characterized by very narrow bandwidths. The following discussion focuses on the use of an AWG, although other filters can also be used in accordance with the present invention.

The role of the AWG is to filter out the undesirable sidebands and, with the cooperation of a signal combiner, combine the two sidebands of interest. For example, an AWG with a channel spacing of 60 GHz ($\Delta\lambda=0.48$ nm) or a channel spacing of 30 GHz ($\Delta\lambda=0.24$ nm) would be well-suited for the 120 GHz system described above. As is illustrated schematically in FIG. 6, where sideband wavelengths generated from the sideband generator as a modulated optical signal $I_{MOD}$ are fed into the optical filter 30, each of the sidebands will come out a separate output channel of the filter 30 according to its characteristic wavelength. By way of illustration, not limitation, if the output of the sideband generator 20 is inserted into the AWG, then the two desired $5^{th}$ order harmonics would come out of ports 3 and 7, as shown schematically in FIG. 6. If, however, a 60 GHz AWG is used, the desired $5^{th}$ order sidebands would come out less displaced but still distinct ports, i.e., ports 4 and 6. One advantage of the 30 GHz AWG is that the port bandwidths are much narrower. However, 30 GHz AWGs are often more difficult to produce and operate. For these reasons, it may be preferable to operate some embodiments of the present invention by utilizing a 60 GHz AWG as the optical filter 30.

Figure 6:
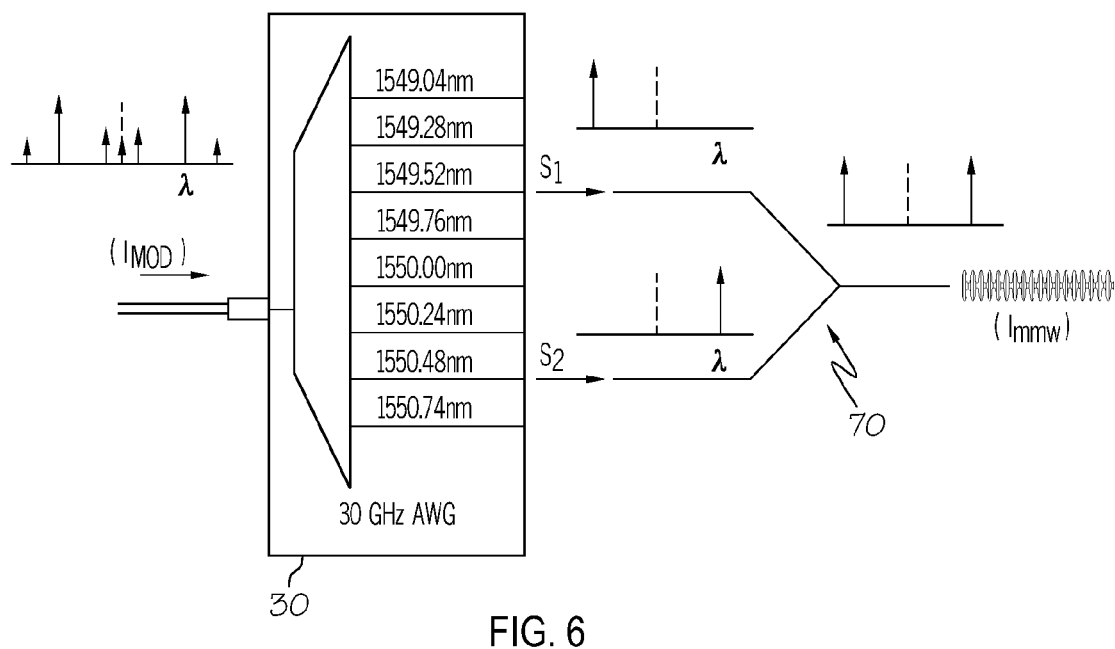
FIG. 6 is a schematic illustration of the operation of an optical filter and signal combiner according to one embodiment of the present invention.

A signal combiner 70 according to the present invention is also illustrated in FIG. 6, where the desired sidebands are combined with a waveguide Y-combiner. For example, if two fifth harmonic sidebands are combined at the signal combiner 70, the optical signal $I_{MMW}$ will have a continuous-wave modulation of 120 GHz. It is contemplated that a signal combiner would not be necessary where the optical filter comprises an optical device that is configured to maintain propagation of the sidebands of interest along a unitary optical path.

Figure 7:
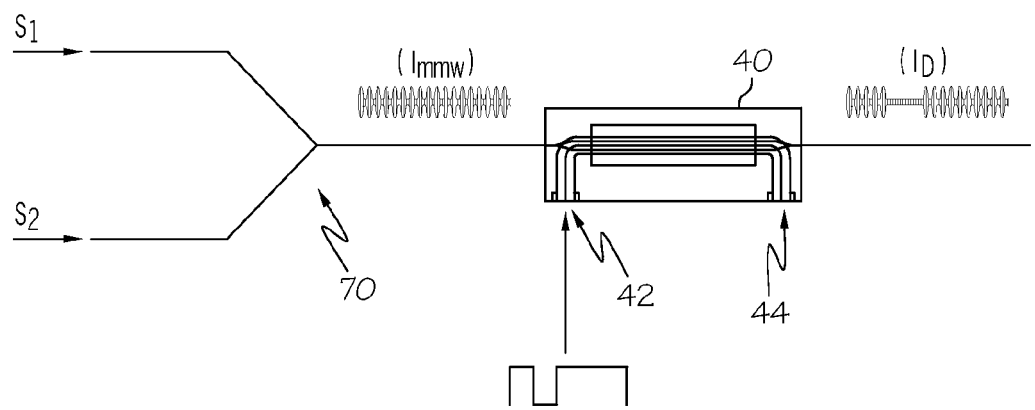
FIG. 7 is a schematic illustration of the operation of data encoder according to one embodiment of the present invention.
Figure 8A:
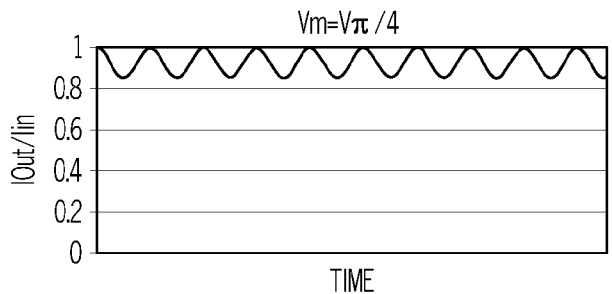
FIGS. 8A-8D are graphic illustrations of the time-domain response of a sideband generator according to another embodiment of the present invention with drive voltage amplitudes equal to $V_\pi/4$, $V_\pi/2$, $V_\pi$, and $2V_\pi$.
Figure 8B:
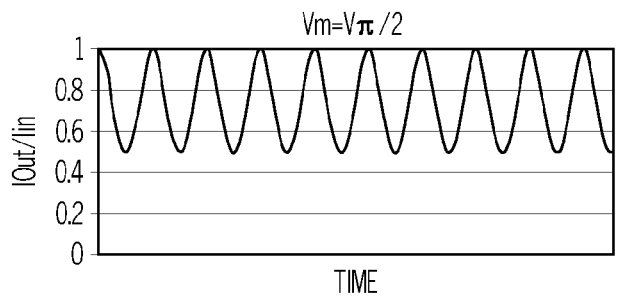
Figure 8C:
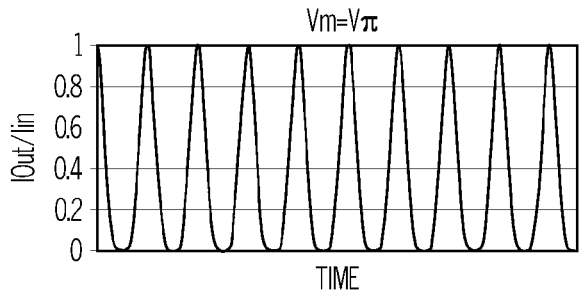
Figure 8D:
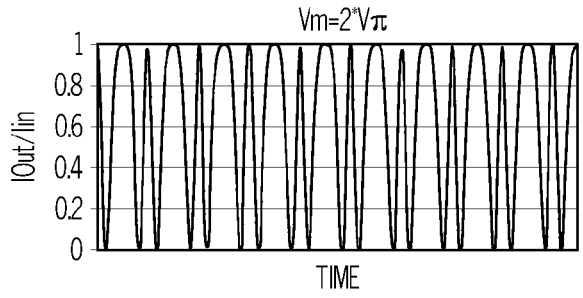

Referring to FIG. 7, once the modulated optical signal $I_{MMW}$ is formed, data can be incorporated on the carrier by utilizing, for example, a 10 GB/s electrical data signal coupled to the data encoder 40 via the data signal input terminal 42 and the 50Ω control signal termination 44. Since it is generally easier to modulate an optical signal than to modulate a THz signal, data is encoded onto the signal $I_{MMW}$ in the optical domain. Here a simple modulator configured as a Mach-Zehnder interferometer is used to encode the data. It is contemplated that alternative means may be employed to modulate the optical signal $I_{MMW}$ in the optical or electrical domain without departing from the scope of the present invention.

Once the data is encoded onto the modulated optical signal, the composite signal $I_D$ can be amplified and then converted to the THz portion of the spectrum. The optical amplification is relatively straight forward. Optical amplifiers, such as Erbium-doped fiber amplifiers will increase optical power without excessive loss of data modulation on the optical signal.

By way of illustration and not limitation, in one mode of operation, a standard telecommunications-grade laser diode 15 operating in the continuous-wave (CW) mode at a bandwidth centered at about 1550 nm provides the optical carrier frequency $\lambda_0$ used in the optical portion of the device 10. An electrooptic modulator functions as the sideband generator 20 and is overdriven in the manner described below such that the resulting optical signal includes a plurality of sidebands S on the optical carrier $\lambda_0$. For example, an appropriately configured modulator overdriven at twice $V\pi$, where $V\pi$ represents the voltage at which a $\pi$ phase shift is induced between respective arms of the modulator, will generate sidebands of interest at 5 times the modulation frequency. Accordingly, overdriving the modulator at 12 GHz will generate sidebands of interest about the 1550 nm optical carrier at +/−60 GHz.

A telecommunications-grade arrayed waveguide grating (AWG) with 60 GHz channels can be used as the optical filter 30 to filter out the carrier optical signal $\lambda_0$ and combine the two optical sidebands of interest, forming the millimeter wave optical signal modulated at 120 GHz. A second electrooptic modulator is used as the data encoder 40 to encode data onto the mmw-modulated optical signal and generate a data-encoded signal $I_D$. A telecommunications grade optical modulator using the electrooptic effect to control the phase in a Mach-Zehnder interferometer can encode data at 10 GB/s or higher.

An optical amplifier 75 increases the modulated optical signal $I_D$ prior to conversion in a suitable optical/electrical converter 80. The optical/electrical converter 80 can take a suitable conventional or yet to be developed form. For example, and not by way of limitation, a high speed photodiode, tuned to operate at 0.12 THz can be used to remove the optical carrier and convert the signal $I_D$ to a modulated THz signal $E_D$.

Although many embodiments of the present invention are illustrated herein with reference to optical signal splitters and combiners in the form of directional coupling regions, it is noted that the present invention contemplates utilization of any suitable conventional or yet to be developed structure for optical signal splitting or combining. For example, suitable alternative structures for splitting and combining optical signals include, but are not limited to, 2×2 directional coupling regions, 1×2 directional coupling regions, 1×2 Y signal splitters and combiners, and 1×2 and 2×2 multimode interference element splitters and combiners. The specific design parameters of these structures are beyond the scope of the present invention and may be gleaned from existing or yet to be developed sources, including U.S. Pat. No. 6,853,758, issued Feb. 8, 2005, the disclosure of which is incorporated herein by reference.

Up to this point, the present discussion has assumed that the initial Mach-Zehnder was biased with a phase difference in the two arms of $V_\pi/2$. However, if the modulator is biased so that the phase difference is equal to $\pi$ (or a multiple of $\pi$), then the output optical signal will have even harmonics ($2\omega$, $4\omega$, $6\omega$, . . . ) of the modulation signal. If the sideband generator 20 is driven with a voltage less than $V_\pi$, then the amplitude of the harmonics will be relatively low. However, as the sideband generator 20 gets driven harder, the magnitude of the harmonics becomes larger than the fundamental carrier frequency. FIGS. 8A-8D show the time-domain response of the sideband generator 20 with drive voltage amplitudes equal to $V\pi/4$, $V_\pi/2$, $V_\pi$, and $2V_\pi$. It should be noted that for this bias configuration, there is no modulation at the fundamental frequency. Instead, the $2^{nd}$ harmonic begins to grow immediately.

Figure 9:
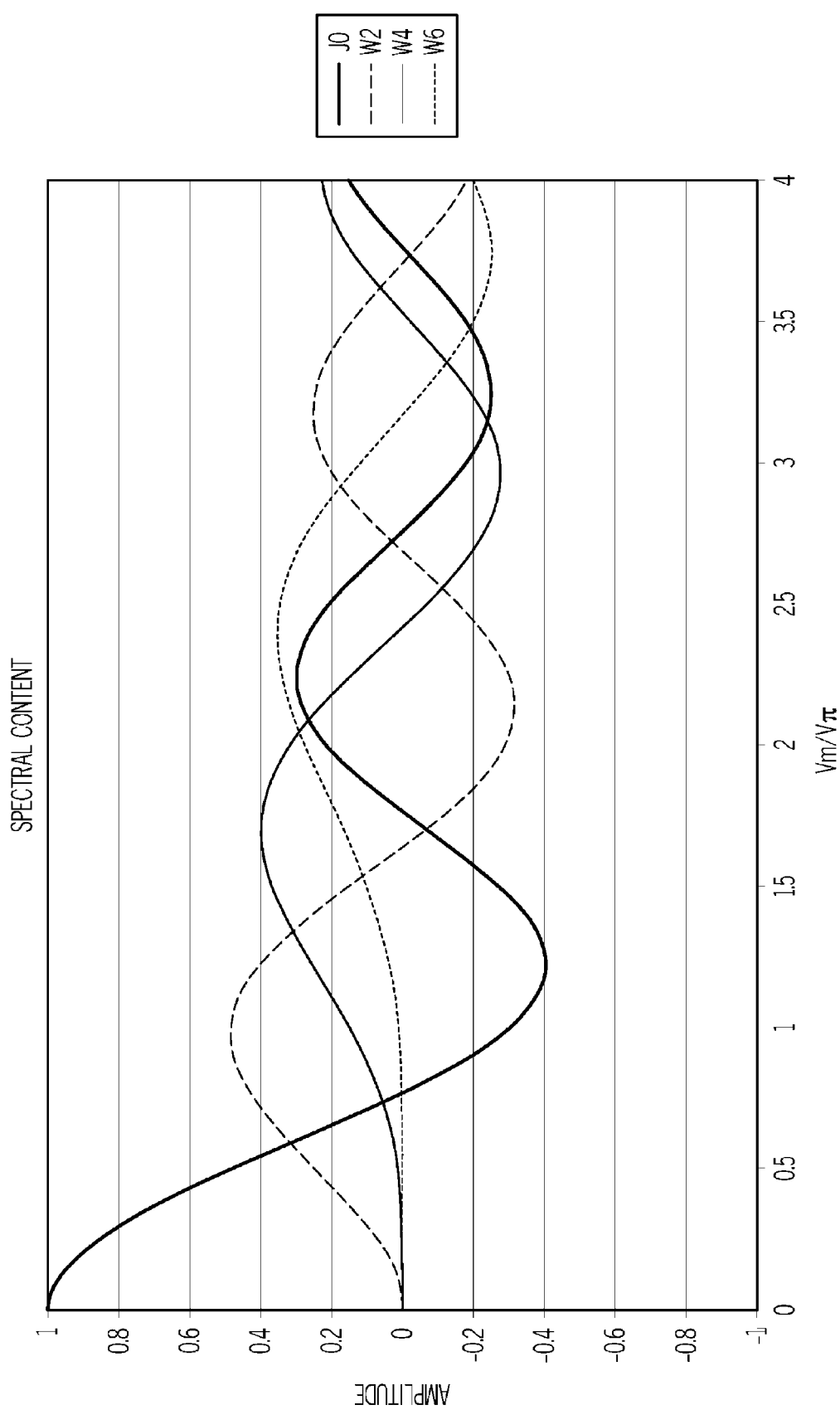
FIG. 9 is a graphic illustration of the relationship between the amplitude of the even numbered harmonics and the normalized drive voltage, $V_m/V_\pi$ in the context of a sideband generator according to one embodiment of the present invention.

FIG. 9 is a graphic representation of the amplitude of the even harmonics, as a function of drive voltage. The graph shows the amplitude of the second harmonic (W2), the fourth harmonic (W4), and the sixth harmonic (W6). The data for J0 corresponds to a relative optical bias of the optical signal. Using the analysis developed earlier, this π bias configuration could be used to form sidebands at two four, and six times the modulation frequency. If we assume a drive frequency of 12 GHz, this bias method could be used to produce optical signals with CW-modulation at 96 GHz (+/− the fourth harmonic) and 144 GHz (+/− the sixth harmonic).

It is contemplated that the drive frequency need not be fixed at a particular value. Specifically, if the 12 GHz modulation control signal is instead provided as a variable frequency source, the frequency of the THz-band signal can also be variable. For example, if the 12 GHz control signal is changed to 12.5 GHz, then the difference of the fifth harmonics will change form 120 GHz to 125 GHz. Of course, any change in the frequency of the harmonics may necessitate a change in the operational parameters of the filter 30 because the new sidebands of interest will need to make it through the filter 30. In a similar way, adding optical switches between the optical filters and the Y-combiner will allow various sidebands to be combined. This can provide flexibility in obtaining a range of continuous wave modulated optical signals.

Figure 10:
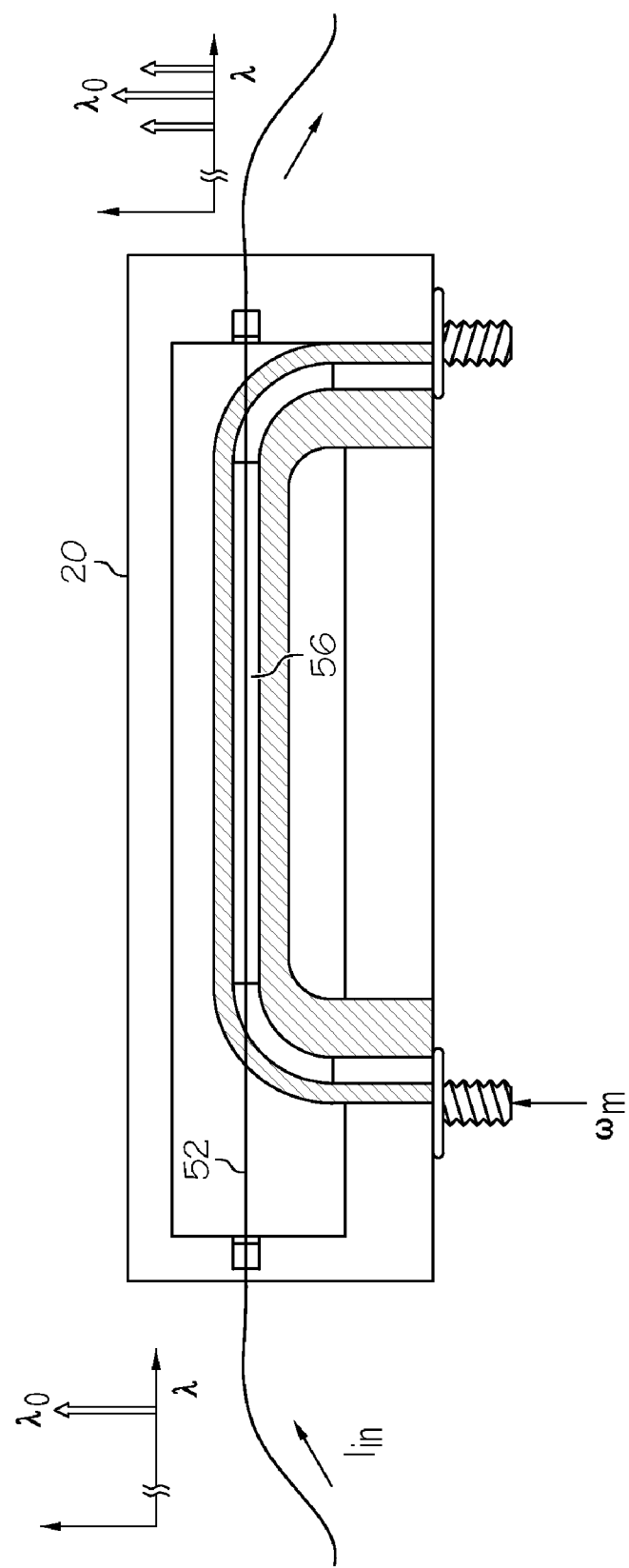
FIG. 10 is a schematic illustration of a phase modulator configuration according to an embodiment of the present invention where a phase modulator is used as a sideband generator.
Figure 11A:
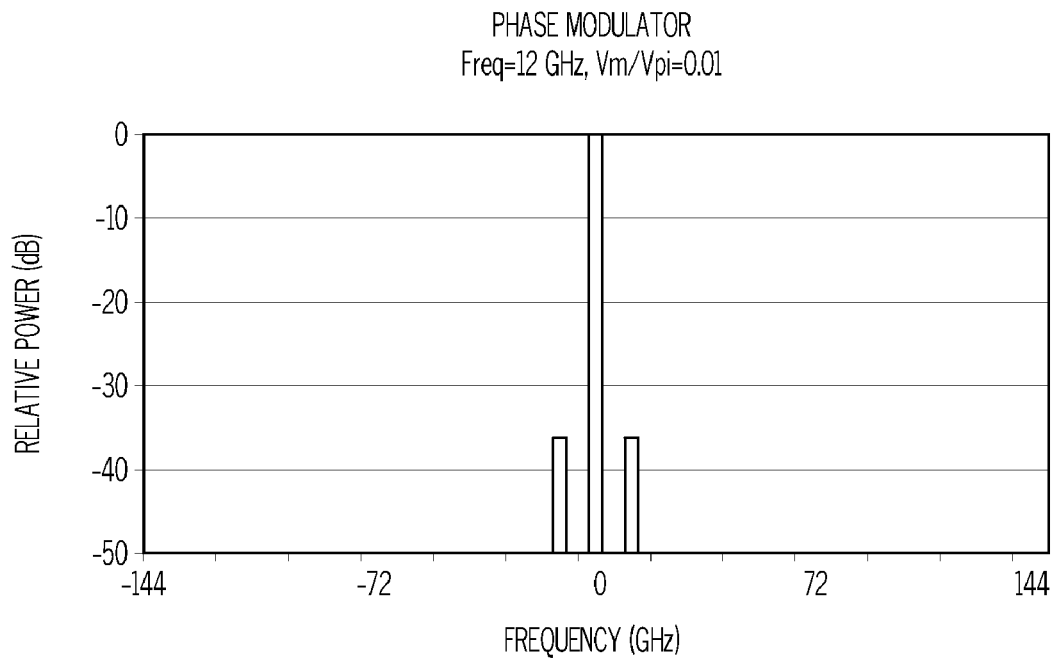
FIGS. 11A-11D are graphic illustrations of an optical spectrum at the output of a phase modulator sideband generator according to an embodiment of the present invention with $V_m=0.01V\pi$, $V_m=0.50V\pi$, $V_m=V\pi$, and $V_m=2.04V\pi$.
Figure 11B:
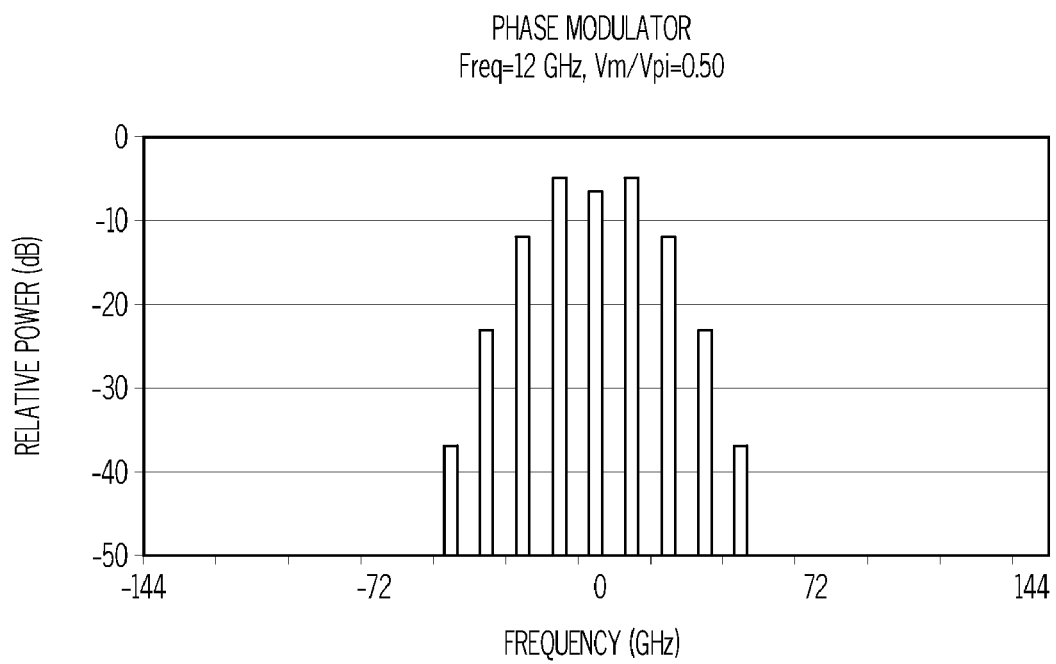
Figure 11C:
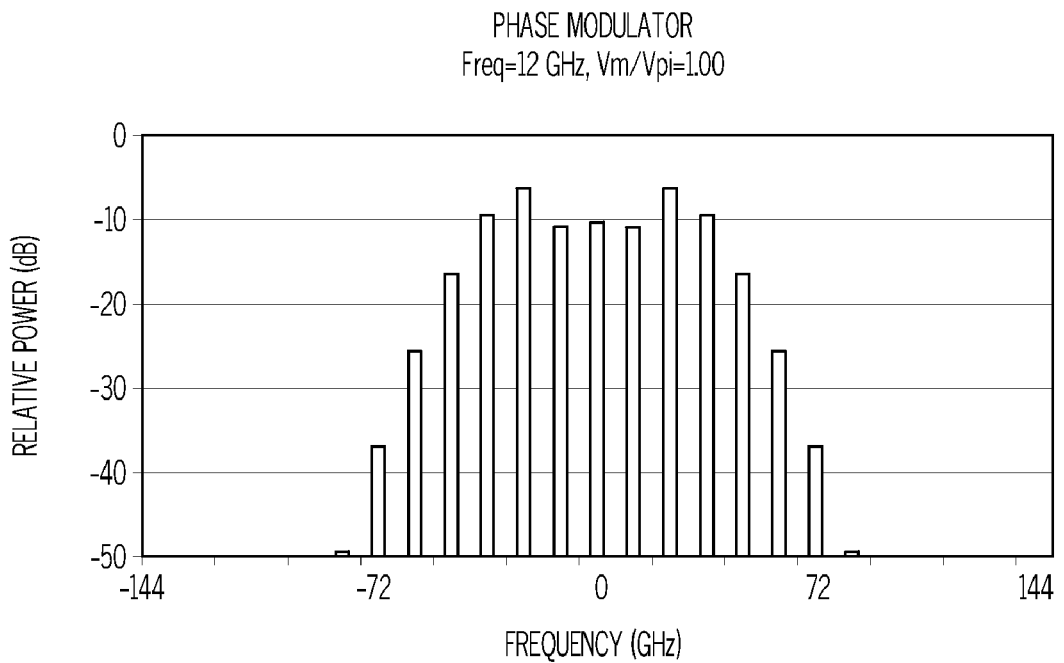
Figure 11D:
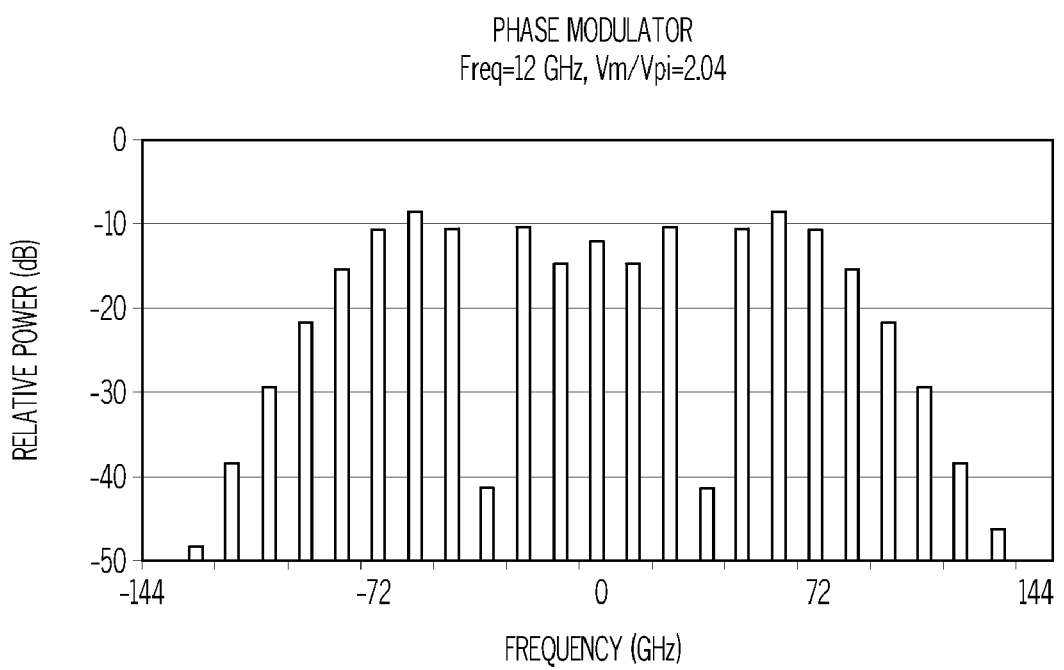

Referring to FIG. 10, it is further contemplated that the sideband generator 20 may take the form of a phase modulator, as opposed to the interferometer described above with reference to FIGS. 1-9. FIG. 10 is a schematic illustration of a suitable phase modulator configuration according to this aspect of the present invention. Generally, the phase modulator sideband generator 20 consists of a straight waveguide 52 with an electrooptic core and/or cladding configured such that, when an electric field is applied across an electrooptically functional portion 56 of the sideband generator 20, the refractive index in the waveguide 52 will change, which in turn will advance or retard the phase of the optical signal propagating through the functional portion 56 of the waveguide 52.

The signal output of a phase modulator of the type illustrated in FIG. 10 can be represented by:

$$E_{out} = E_{in}\cos\left(\omega_c t + \frac{v_m \pi}{V_\pi}\sin(\omega_m t)\right)$$

where $\omega_c$ is the optical frequency, $\omega_m$ is the modulation frequency, and the electric field and intensity of the signal can be represented as $$I=E^2$$

If the magnitude of the phase modulator voltage is such that $v_m=v_\pi$, then the phase term will modulate between $+\pi$ and $-\pi$ as $\sin \omega_m t$ varies from −1 to 1. Stated differently, under the condition $v_m=v_\pi$, we will have a $2\pi$ phase shift.

As we note above in the context of the interferometer-based sideband generator, the magnitude of the output optical signal at the fundamental frequency and at each of the odd harmonics (i.e. $3\omega_m$, $5\omega_m$, . . . ) can be calculated using Bessel functions. FIGS. 11A-11D illustrate the relative magnitudes of the fundamental and odd harmonics at the output of a phase modulator sideband generator 20 according to the present invention with $V_m=0.01V\pi$, $V_m=0.50V\pi$, $V_m=V\pi$, and $V_m=2.04V\pi$. As is the case for the interferometer-based sideband generator 20, the magnitude of the fifth-order harmonic for the phase modulator sideband generator 20 reaches a maximum at $V_m=2.04V\pi$.

A number of factors come into play when choosing between an interferometer-based sideband generator 20 and a phase modulator sideband generator 20. Specifically, in the case of the interferometer the output intensity varies with drive voltage and the DC bias on the interferometer can be used to adjust the output intensity signal and control the relative height of the sidebands. In contrast, when the sideband generator 20 is configured as a phase modulator, the output intensity remains relatively constant as the drive voltage is varied—only the phase of the optical signal is varied. In addition, the DC bias if the drive voltage will not affect output intensity and will not alter the height of the sidebands generated by the phase modulator. A phase modulator is as efficient at generating sidebands as an interferometer. For example, referring to FIGS. 4 and 11D, both types of sideband generators will optimize the 5th harmonic with a drive signal of about $2.04V\pi$.

Interferometers can be run in a push-pull configuration and can therefore obtain a π phase shift in half the length of a single waveguide device. Phase modulators cannot be run in a push-pull condition. Accordingly, with equivalent electrooptic material, a phase modulator would have to be roughly twice as long as an interferometer. However, if an interferometer is biased at π/2, it will have a 3 dB (50%) inherent loss. In contrast, the phase modulator is not subject to this inherent loss. Accordingly, those practicing the present invention may wish to consider these factors and the optical attenuation of available electrooptic materials in choosing between interferometer-based and phase modulator type sideband generators.

As is illustrated schematically in FIG. 2B, the sideband generator 20, the optical filter 30, the data encoder 40, and the waveguide network 55, are configured such that they can be conveniently formed over a common device substrate 60. Specifically, as will be appreciated by those familiar with the optical waveguides, electrooptic modulators, and arrayed waveguide gratings described in the literature and in the U.S. patent documents incorporated by reference below, the respective functional structures of the sideband generator 20, the optical filter 30, the data encoder 40, and the waveguide network 55 are each suitable for fabrication over a common substrate 60 comprising, for example, a silica cladding layer supported by a silicon underlayer. This ability to be formed over a common device substrate holds true even where the respective structures of these devices incorporate diverse components and configurations. Accordingly, it is noted that the scope of the present invention extends to general device configurations and is not limited to the provision of a sideband generator 20 that is driven at a control voltage that is larger than $V\pi$.

The embodiment illustrated in FIG. 2B may also include a waveguide network 50 that comprises a substantially continuous waveguide core extending from the optical input 12 of the device 10 to the optical output 14 of the device 10. More specifically, referring to FIG. 2B in further detail, the waveguide network 50 may comprise operational waveguide portions 52 and transitional waveguide portions 54. The operational waveguide portions would be defined in the sideband generator 20, the optical filter 30, and the data encoder 40 while the transitional waveguide portions 54 would be configured to direct an optical signal between the optical input 12, the sideband generator 20, the optical filter 30, the data encoder 40, and the optical output 14 of the electrooptic source 10. Given these portions it is contemplated that the operational and the transitional waveguide portions 52, 54 can be comprised of a common optical transmission medium that is present over at least a majority of the respective optical path lengths defined by the operational and transitional waveguide portions 52, 54. Further, the operational and transitional waveguide portions 52, 54 can be configured to define a substantially planar lightwave circuit.

The waveguide medium of the waveguide network may comprise a silica-based waveguide formed over a silica cladding layer while the waveguide medium of the sideband generator may comprise a waveguide core surrounded by or embedded within a polymeric electrooptic cladding medium. Nevertheless, the distinct components lend themselves to formation over a common substrate, often in the nature of a planar lightwave circuit (PLC). For the purposes of defining and describing the present invention, it is noted that the term "over" contemplates the presence of intervening layers between two layers or regions. For example, a waveguide medium formed over a silicon substrate contemplates the possibility of intervening layers between the waveguide medium and the silicon substrate. The specific composition of the optical transmission medium forming the waveguide core is not a point of emphasis in many embodiments of the present invention and may, for example, be selected from materials comprising doped or undoped silica, doped or un-doped silicon, silicon-oxynitride, polymers, and combinations thereof.

For the purposes of describing and defining the present invention, it is noted that a planar lightwave circuit (PLC) typically merely defines an optical input, an optical output, and points of propagation there between that lie in a substantially common plane or are formed over a substantially planar circuit component. Use of the word "circuit" herein is not intended to create an inference that an optical signal propagating in a PLC returns to its point of origin.

A variety of configurations may be utilized to form the electrooptic modulators of the present invention. For example, and not by way of limitation, the functional regions of the electrooptic modulators may comprise: electrooptically clad silica waveguides; silicon waveguides with electroabsorptive modulators where charge injected into the silicon waveguide makes the waveguide opaque; sol-gel waveguides with electrooptic claddings; lithium niobate waveguides, where the refractive index of the waveguide is dependent upon an applied electric field; and electrooptic polymer waveguides. For example, and not by way of limitation, where the electrooptic modulator comprises a waveguide core and an optically functional cladding region optically coupled to the waveguide core, the optically functional cladding region may comprise a poled or un-poled electrooptic polymer dominated by the Pockels Effect, the Kerr Effect, or some other electrooptic effect.

For the purposes of describing and defining the present invention, it is noted that an electrooptic functional region is a region of an optical waveguide structure where application of an electrical control signal to the region alters the characteristics of an optical signal propagating along an optical axis defined in the waveguide structure to a significantly greater extent than in non-electrooptic regions of the structure. For example, electrooptic functional regions according to the present invention may comprise an electrooptic polymer configured to define an index of refraction that varies under application of a suitable electric field generated by control electrodes. Such a polymer may comprise a poled or un-poled electrooptic polymer dominated by the Pockels Effect, the Kerr Effect, or some other electrooptic effect. These effects and the various structures and materials suitable for their creation and use are described in detail in the context of waveguide devices in the following published and issued patent documents, the disclosures of which are incorporated herein by reference: U.S. Pat. Nos. 6,931,164 for Waveguide Devices Incorporating Kerr-Based and Other Similar Optically Functional Mediums, 6,610,219 for Functional Materials for use in Optical Systems, 6,687,425 for Waveguides and Devices Incorporating Optically Functional Cladding Regions, and 6,853,758 for Scheme for Controlling Polarization in Waveguides; and U.S. PG Pub. Nos. 2005/0226547 A1 for Electrooptic Modulator Employing DC Coupled Electrodes, 2004/0184694 A1 for Electrooptic Modulators and Waveguide Devices Incorporating the Same, and 2004/0131303 A1 for Embedded Electrode Integrated Optical Devices and Methods of Fabrication. Further, it is noted that, various teachings regarding materials and structures suitable for generating the Pockels Effect, the Kerr Effect, and other electrooptic effects in an optical waveguide structure are represented in the patent literature as a whole, particularly those patent documents in the waveguide art assigned to Optimer Photonics Inc. or naming Richard W. Ridgway, Steven M. Risser; Vincent McGinniss, and/or David W. Nippa as inventors.

For the purposes of defining and describing the present invention, it is noted that the wavelength of "light" or an "optical signal" is not limited to any particular wavelength or portion of the electromagnetic spectrum. Rather, "light" and "optical signals," which terms are used interchangeably throughout the present specification and are not intended to cover distinct sets of subject matter, are defined herein to cover any wavelength of electromagnetic radiation capable of propagating in an optical waveguide. For example, light or optical signals in the visible and infrared portions of the electromagnetic spectrum are both capable of propagating in an optical waveguide. An optical waveguide may comprise any suitable signal propagating structure. Examples of optical waveguides include, but are not limited to, optical fibers, slab waveguides, and thin-films used, for example, in integrated optical circuits.

For the purposes of defining and describing the present invention, it is noted that a Mach-Zehnder interferometer structure generally comprises an optical configuration where an optical signal propagating along a waveguide is split into a pair of waveguide arms and recombined into a single waveguide following treatment of the respective optical signals propagating in one or both of the waveguide arms. For example, the signal in one of the waveguide arms may be treated such that the optical signal propagating therein is subject to a given phase delay. As a result, when the signals of the respective waveguide arms are recombined, they interfere and generate an output signal indicative of the interference. A number of Mach-Zehnder interferometer structures are illustrated in detail in the above-noted patent documents.

The detectors 150 illustrated schematically in FIG. 1 may take any form suitable for the detection and analysis of millimeter and submillimeter waves. For example, and not by way of limitation, the detectors 150 may comprise Schottky diode detectors, examples of which include: a GaAs beam-lead detector diode, which may be fabricated using the modified barrier integrated diode (MBID) process described in U.S. Pat. No. 4,839,709; and silicon zero bias Schottky detectors, which exhibit good performance at room temperature and frequencies under 10 GHz.

Referring collectively to FIGS. 12-19, according to one embodiment of the present invention, the detectors 150 can be configured as an electrooptic antenna assembly 150. Generally, the antenna assembly 150 comprises an antenna portion 20' and an electrooptic waveguide portion 30'. The antenna portion 20' is configured as a tapered slot antenna, the design of which will be described in further detail below with reference to FIGS. 14 and 15. The waveguide portion 30' comprises at least one electrooptic waveguide 32' that extends along at least a portion of an optical path between an optical input 34' and an optical output 36' of the antenna assembly 150.

The electrooptic waveguide 32' comprises a waveguide core 35' that extends substantially parallel to a slotline 22' of the tapered slot antenna 20' in an active region 15' of the antenna assembly 150 and at least partially comprises a velocity matching electrooptic polymer 38' in the active region 15' of the antenna assembly 150. It is contemplated that the velocity matching electrooptic polymer 38' may form the waveguide core 35', all or part of the cladding surrounding a non-polymeric waveguide core, or both the core 35' and the cladding of the waveguide 32'.

The tapered slot antenna 20' and the electrooptic waveguide 32' are positioned relative to each other such that: (i) the velocity $v_e$ of a millimeter or sub-millimeter wave signal 100 traveling along the tapered slot antenna 20' in the active region 15' is at least partially a function of the dielectric constant of the velocity matching electrooptic polymer 38' and (ii) the velocity $v_O$ of an optical signal propagating along the waveguide core 35' in the active region 15' is at least partially a function of the index of refraction of the velocity matching electrooptic polymer 38'. For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

Given this common dependency on the properties of the velocity matching electrooptic polymer 38', the active region 15' and the velocity matching electrooptic polymer 38' of the antenna assembly 150 can be configured to enhance the velocity matching of the millimeter wave and the optical signal in the active region 15'. For example, It is contemplated that the active region 15' and the velocity matching electrooptic polymer 38' can be configured such that $v_e$ and $v_O$ are substantially the same in the active region or such that they at least satisfy the following relation:

$$\frac{|v_e - v_O|}{v_O} \leq 20\%.$$

Although the antenna assembly described above is not limited to specific antenna applications, the significance of the velocity matching characteristics of the assembly can be described with reference to applications where a millimeter-wave signal traveling along the tapered slot antenna 20' creates sidebands on an optical carrier signal propagating in the waveguide core 35'. Specifically, as is described above with reference to FIGS. 2-11, a millimeter-wave signal can be used to create sidebands on an optical carrier by directing a coherent optical signal of frequency $\omega_O$, along the electrooptic waveguide portion of an electrooptic modulator while a millimeter-wave voltage of frequency $\omega_m$ is input to the traveling wave electrodes of the modulator. In the embodiment of the present invention illustrated in FIGS. 12 and 13, the first and second electrically conductive elements 24', 26' of the tapered slot antenna 20' and the electrooptic waveguide 32' form the electrooptic modulator and a coherent optical carrier signal is directed along the electrooptic waveguide 32'. The first and second electrically conductive elements 24', 26' function in a manner that is analogous to the respective traveling wave electrodes described in the aforementioned publication and, as such, cooperate with the electrooptic waveguide 32' to create sidebands on the optical carrier propagating along electrooptic waveguide 32'.

More specifically, as the optical carrier $\omega_O$, and millimeter-wave signal 100 co-propagate along the length of the electrooptic modulator formed by the tapered slot antenna 20' and the electrooptic waveguide 32', the interaction of the electric field of the millimeter-wave 100 with the electrooptic material of the polymer in the active region 15' creates a refractive index change in the electrooptic waveguide 32' which oscillates with the time-varying electric field of the millimeter-wave 100. This time variation of the refractive index results in a time-dependent phase shift of the optical carrier, which is equivalent to imparting sidebands to the optical carrier $\omega_O$. The modulation of the optical carrier by the millimeter-wave voltage results in an optical output from the modulator which has a component at the carrier frequency $\omega_O$, and at sideband frequencies $\omega_O \pm \omega_m$. The present inventors have recognized that magnitude of the response at the sidebands is determined by the ratio of the millimeter-wave voltage to $V_\pi$, the voltage required to completely change the modulator from the on to the off state, and by the degree of velocity matching between the optical carrier and the millimeter-wave that co-propagate along the modulator.

Although the millimeter-wave voltage is an external variable, the degree of velocity matching between the optical carrier and the millimeter-wave is primarily a function of the design parameters of the antenna assembly 150 and, as such, can be optimized through careful control of the design of the parameters of the antenna assembly 150. For example, as the millimeter-wave propagates through the active region 15', which comprises the electrically conductive elements 24', 26' of the tapered slot antenna 20' and a dielectric substrate 40', the velocity $v_e$ of the millimeter or sub-millimeter wave signal in the active region 15' is a function of effective permittivity $\in_{eff}$ of the active region 15':

$$v_e = \frac{c}{\sqrt{\varepsilon_{eff}}}$$

In the active region 15', the dielectric substrate 40' defines a thickness t and comprises a base layer 42', the waveguide core 35', the velocity matching electrooptic polymer 38', at least one additional optical cladding layer 44', each of which contribute to the thickness t in the active region 15'. Thus, the effective permittivity $\in_{eff}$ of the active region 15' is a function of the substrate thickness t and the respective dielectric constants of the base layer 42', the waveguide core 35', the velocity matching electrooptic polymer 38', and the additional optical cladding layers 44'.

The velocity $v_O$ of the optical signal propagating along the waveguide 32' in the active region 15' is a function of the effective index of refraction $\eta_{eff}$ of the active region 15':

$$v_O = \frac{c}{\eta_{eff}}$$

The effective index of refraction $\eta_{eff}$ of the active region 15' is a function of the respective indices of refraction of the waveguide core 35', the velocity matching electrooptic polymer 38', and the additional optical cladding layers 44'. Accordingly, the degree of velocity matching between the optical carrier and the millimeter-wave can be optimized by controlling the effective permittivity $\in_{eff}$ and the effective index of refraction $\eta_{eff}$ of the active region 15'.

Where a velocity matching electrooptic polymer is selected as a component of the waveguide 32', it is possible to configure the electrooptic modulator such that the effective index of refraction $\eta_{eff}$ of the active region 15' is 1.5 and the velocity $v_O$ of the optical signal is:

$$v_O = \frac{c}{1.5}$$

In the same context, if we select a silica-based dielectric substrate 40' and use the velocity matching electrooptic polymer in the waveguide 32', it is possible to configure the active region such that the effective permittivity $\in_{eff}$ of the active region is 2.25 and the velocity $v_e$ of the millimeter or sub-millimeter wave signal matches the velocity $v_O$ of the optical signal:

$$v_e = \frac{c}{\sqrt{2.25}} = \frac{c}{1.5}$$

In contrast, the velocity $v_e$ of the millimeter or sub-millimeter wave signal in a conventional silica-based tapered slot antenna having an effective permittivity $\in_{eff}$ of about 3.76 would be significantly different than the velocity $v_O$ of the optical signal:

$$v_e = \frac{c}{\sqrt{3.76}} = \frac{c}{1.94}$$

To maintain total phase shift in the electrooptic modulator structure of the active region 15' within 50% of the maximum possible phase shift, the active region 15' and the velocity matching electrooptic polymer 38' should be configured such that the velocity $v_e$ and the velocity $v_O$ satisfy the following relation:

$$\left|1 - \frac{v_e}{v_O}\right| \leq \frac{2.8}{L\beta}$$

where L is the length of the active region and $\beta$ is the propagation constant of the waveguide.

One method to achieve velocity matching is to use materials where the respective velocities of the optical signal and the millimeter-wave are effectively equal. Velocity matching can also be achieved through specialized device design. For example, the thickness of the dielectric substrate or any of its component layers can be tailored through silicon micromachining, reactive ion etching, or otherwise to achieve velocity matching. Alternatively, one can construct an effective dielectric constant by altering the geometry of the dielectric substrate 40', e.g., by forming holes in the dielectric, or changing the shape or dimensions of the dielectric. Referring to the antennae 20' illustrated in FIGS. 14 and 15, in the context of a 94 GHz wave traveling along the antennae 20', assuming the slotline 22' is characterized by an electrode gap of 20' microns in the active region 15' and the electrodes 24', 26' are fabricated on silica, a dielectric substrate thickness t of approximately 170 microns can form the basis of a device design with suitable velocity matching between the millimeter wave and an optical signal wave.

Figure 12:
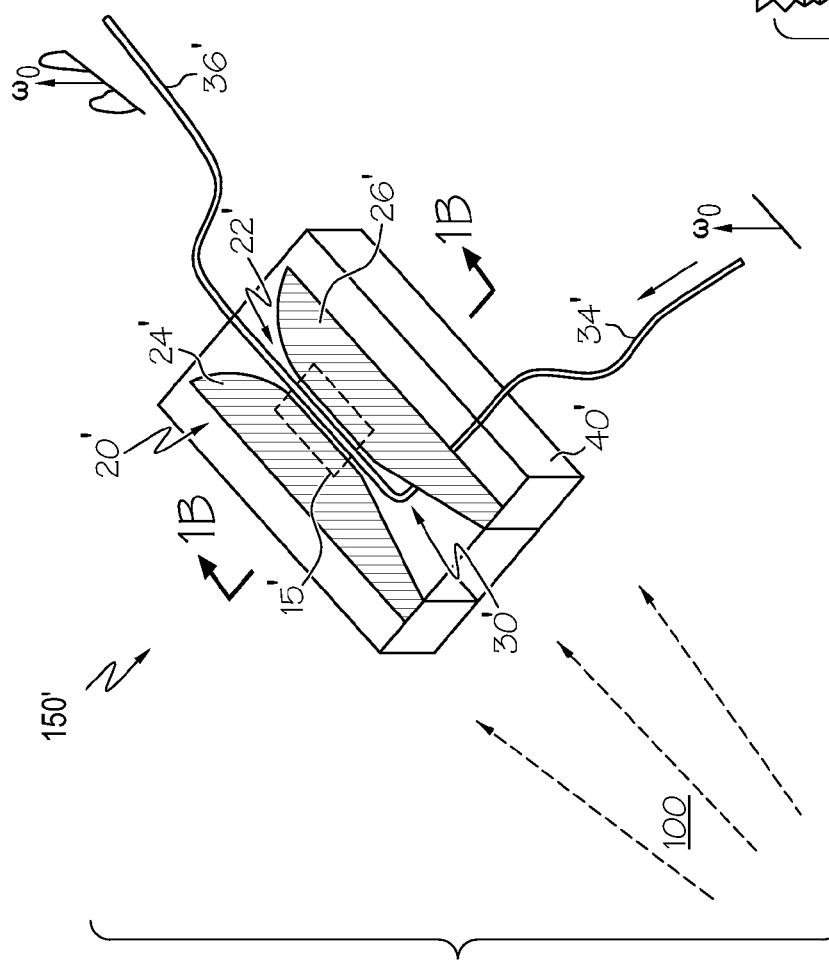
FIG. 12 is a schematic illustration of an electrooptic antenna assembly according to one embodiment of the present invention.
Figure 13:
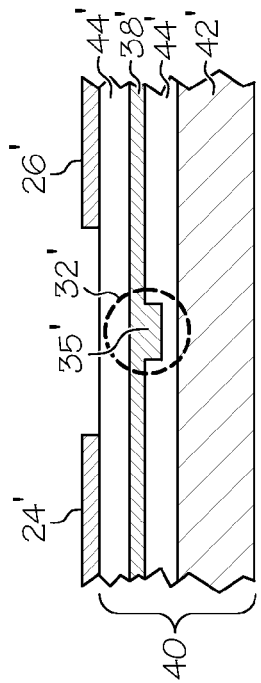
FIG. 13 is a schematic cross sectional illustration of the active region of the antenna assembly illustrated in FIG. 12.

The antenna assembly 150 illustrated in FIGS. 12 and 13 is configured such that an optical signal propagating from the optical input 34' to the optical output 36' merely passes through a single active region 15' comprising a single tapered slot antenna 20'. Turning more specifically to the design of the tapered slot antenna 20', it is noted that tapered slot antennae (TSA) are end-fire traveling wave antennae and typically consist of a tapered slot etched onto a thin film of metal. This can be done either with or without a dielectric substrate on one side of the film. Planar tapered slot antennae have two common features: the radiating slot and a feed line. The radiating slot acts as the ground plane for the antenna and the antenna is fed by the feed line, which may, for example, be a balanced slotline or any suitable feed structure. The nature of the specific feed structure to be used is beyond the scope of the present invention and may be gleaned from any conventional or yet to be developed teachings on the subject, including those teachings set forth in U.S. Pat. No. 6,317,094, the germane portions of which are incorporated herein by reference. Generally, the feed structure should be relatively compact and have low loss. Suitable feed structures include, but are not limited to, coaxial line feeds and the microstrip line feeds. For the purposes of defining and describing the present invention, it is noted that reference herein to an antenna "assembly" is not intended to imply that the assembly is a one-piece, integral assembly or even an assembly where all of the recited components are physical connected to each other. Rather, antenna assemblies according to the present invention may merely be a collection of components that are functionally linked to each other in a particular manner.

Figure 15:
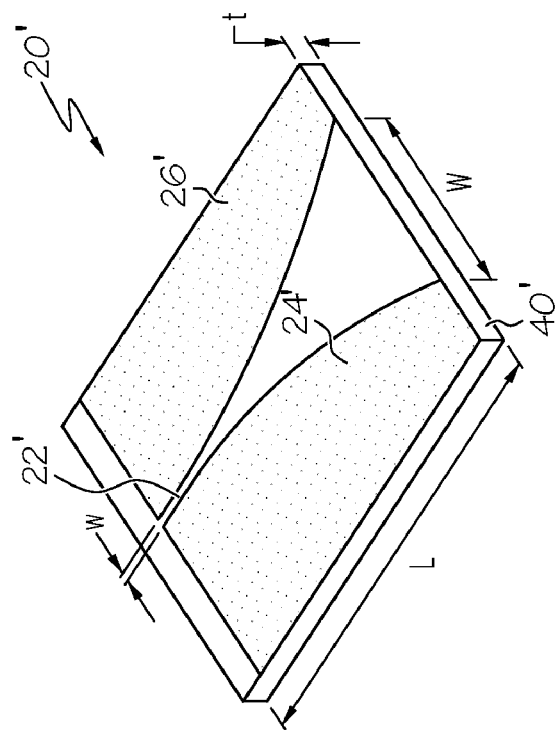
FIGS. 14 and 15 are schematic illustrations of two of the many alternative tapered slot antenna configurations for use in embodiments of the present invention.
Figure 14:
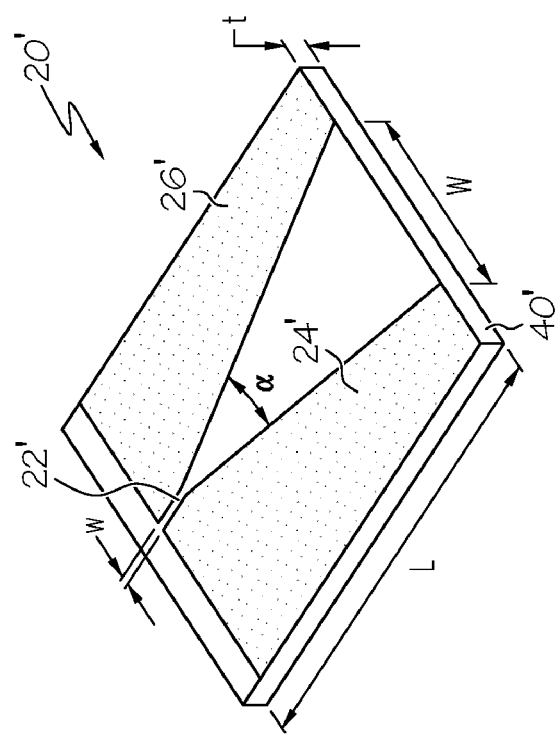

Many taper profiles exist for TSA including, but not limited to, exponential, tangential, parabolic, linear, linear-constant, exponential-constant, step-constant, broken linear, etc. FIG. 14 shows a linearly tapered profile. FIG. 15 shows a Vivaldi profile. In FIGS. 14 and 15, the gap between the first and second electrically conductive elements 24', 26' of the tapered slot antenna 20' is much smaller in the active region 15', e.g., on the order of 20' microns, and behaves much more like a waveguide for the millimeter-wave signal. The reduction in the gap between the two electrically conductive elements 24', 26' of the antenna 20' increases the magnitude of the electric field of the millimeter-wave signal, which is important for electrooptic materials where the response is proportional to the electric field, as opposed to the voltage across the gap. In operation, incident millimeter-wave radiation enters the antenna opening and propagates along the antenna elements 24', 26' toward the active region 15'. The millimeter-wave signal exits the active region 15' and can be re-radiated or terminated into a fixed impedance.

The antenna assemblies illustrated in FIGS. 12-15 may, for example, be fabricated by first providing the base layer 42' with a degree of surface roughness that is sufficiently low for optical applications. The lower cladding 44' is coated onto this substrate and a waveguide pattern is etched therein. The waveguide core and the velocity matching electrooptic polymer 38', which may be formed of the same or different materials, are then coated onto the etched cladding and an upper cladding 44' is formed over the electrooptic layer 38. Finally, the electrically conductive elements 24', 26' of the tapered slot antenna 20' are fabricated on the top cladding.

The electrooptic material 38' can be poled, if required for the response. The refractive indices of the lower and upper claddings 44' are lower than that of the electrooptic layer 38', and the thickness of the claddings 44' are sufficient to optically isolate the optical carrier from the substrate 42' and the antenna 20'. The thickness of the electrooptic layer 38' is such that guided modes of the optical carrier are confined to the defined electrooptic waveguide. Although waveguide fabrication has been described herein in the context of etching the lower cladding, any other method for forming an electrooptic waveguide in an electrooptic material, such as etching the electrooptic material, photobleaching, or diffusion, can be used to define the electrooptic waveguide.

As is noted above, the tapered slot antenna 20' comprises first and second electrically conductive elements 24', 26' arranged to define the radiating slot of the antenna 20'. Although the embodiments of FIGS. 12-15 include first and second electrically conductive elements 24', 26' arranged in a common plane, above the electrooptic waveguide 32', alternative configurations are contemplated. For example, referring to FIGS. 16 and 17, the first and second electrically conductive elements 24', 26' can be arranged in different planes, one above the electrooptic waveguide 32' and the other below the electrooptic waveguide 32. In addition, as is illustrated in FIGS. 16 and 17, the first and second electrically conductive elements 24', 26' can be are arranged to overlap in the active region 15' of the antenna assembly.

Figure 17:
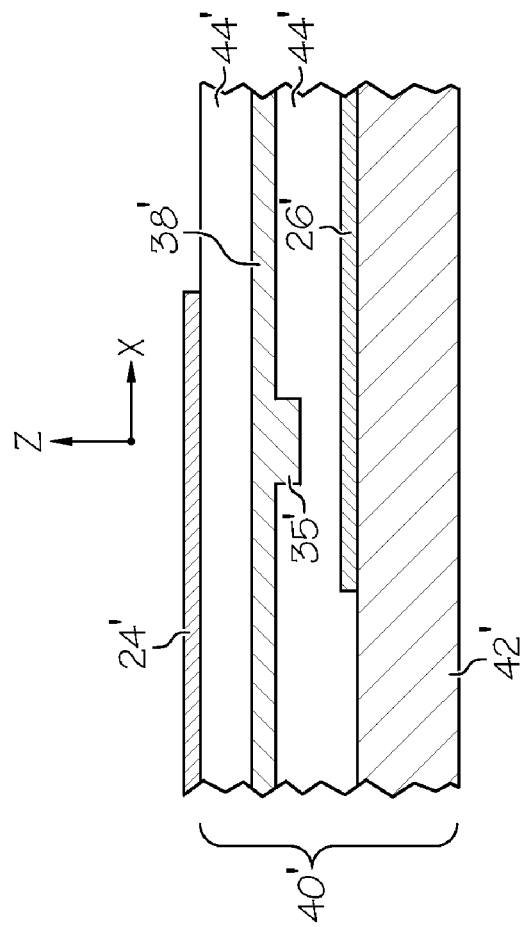
FIG. 17 is a schematic cross sectional illustration of the active region of the antenna assembly illustrated in FIG. 4.
Figure 16:
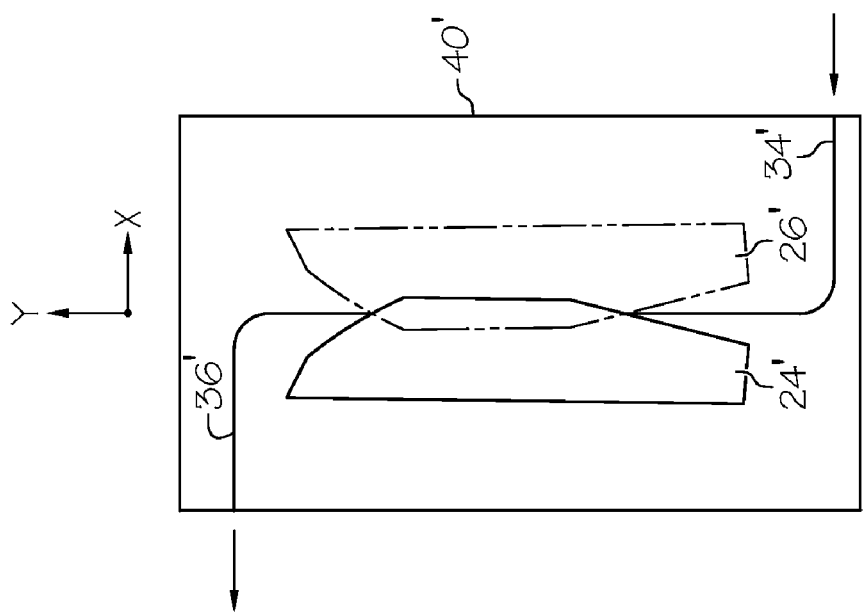
FIG. 16 is a schematic plan view of an antenna assembly according to another embodiment of the present invention.

It is contemplated that the fabrication approach illustrated in FIGS. 16 and 17 can lead to an enhanced response of the EO polymer modulator to the millimeter wave, improving the responsiveness of the antenna. This enhanced response can result from both improved poling of the electrooptic material and stronger interaction between the millimeter-wave electric field and the electrooptic material. The assembly of FIGS. 16 and 17 can be fabricated by forming the lower electrode 26' on the substrate 42', applying the lower cladding 44', forming the waveguide core 35', applying the electrooptic layer 38' and the upper cladding 44', and finally forming the upper electrode 24' of the tapered slot antenna 20'. The present inventors have recognized that many current electrooptic polymers have better electrooptic response when poled by parallel plate electrodes, as compared to coplanar electrodes. Accordingly, at this point, the electrooptic material can be poled, if required for the EO response, using conventional or other suitable, yet to be developed poling conditions for the EO material.

The total thickness of the claddings and electrooptic layer is typically in the range of 5 to 25 microns, although other thicknesses are within the scope of the present invention. When the millimeter-wave radiation is first incident on the antenna, the electric field is polarized along the X-axis in FIGS. 16 and 17. However, as the millimeter-wave propagates along the antenna 20', the polarization of the electric field is rotated until the field is polarized in the Z-direction in the active region 15'. In the active region, because the millimeter-wave is more tightly confined to the cladding and electrooptic material, the velocity of the millimeter-wave signal is determined by the effective dielectric constant of these combined layers.

In applications of the present invention where TM light does not guide in the waveguide 32' until after the device has been poled, additional metal can be added on the substrate surface to allow for poling of the complete length of the waveguide 32'. For simplicity, the waveguide can be routed to exit the device on the same side as which it entered, although this is not a requirement. The device is fabricated by first forming the lower electrode 26' on the base layer 42', applying the lower cladding 44', forming the waveguide core 35' and the electrooptic layer 38', then the upper cladding 44'. After the upper cladding 44' is placed on the device, a set of poling electrodes is formed over the waveguide 32' and the electrooptic material 38' is poled. These poling electrodes can be removed for convenient fabrication of the upper electrode 24', which is subsequently formed on the upper cladding 44'.

In the configuration of FIGS. 16 and 17, where the vertical separation between the first and second electrically conductive elements 24', 26' is on the order of about 5 to 25 microns, the electric field in the active region 15' will alter the refractive index seen by the TM polarized light propagating in the electrooptic waveguide 32'. The electrodes provide a parallel plate field, which can be more efficient interacting with the electrooptic material than the field generated with the coplanar electrodes illustrated in FIGS. 12-15. This enhanced electric field and the potentially smaller electrode gap can dramatically enhance the response of the antenna assembly 150 to millimeter-wave radiation.

In each of the embodiments described herein with reference to FIGS. 12-17, an optical carrier signal at the optical input 34' of the waveguide 32' enters the antenna slot 22' and continues through to the active region 15. In the active region 15, the electric field of the incident millimeter-wave (MMW) 100 interacts with the electrooptic material 38' of the active region 15' to alter the phase of the optical signal. The optical signal accumulates phase shift over the entire length of the active region 15' and propagates to the optical output 36' of the waveguide 32', where the optical carrier is transitioned to an optical fiber, waveguide, or other optical medium.

FIGS. 12-17 depict the active region 15' as a phase modulating electrooptic modulator, where the optical signal remains in a single waveguide. Alternatively, it is possible to configure the active region as a Mach-Zehnder interferometer (MZI). In this case, the optical signal would be evenly divided between two electrooptic waveguides before one of the arms enters the active region 15' between the two electrodes 24', 26' of the tapered slot antenna 20'. The second arm would remain outside the active region of the antenna 20'. Downstream of the active region, the two optical signals would be recombined. It is also contemplated that one or both of the waveguide arms could have a mechanism to alter the phase of light propagating along that arm. The relative phase between the two waveguide arms could be adjusted so the MZI could be in its lowest power state. In this state, the optical carrier could be reduced by 15 or more dB, while the power contained in the sidebands would be unaltered. Because only half the original optical power traverses the active region, the power in the sideband would be approximately 3 dB lower than in the phase modulator case. However, because the carrier would be reduced by much more than 3 dB, it is contemplated that the signal to noise ratio would be greatly improved using the MZI configuration.

Figure 18:
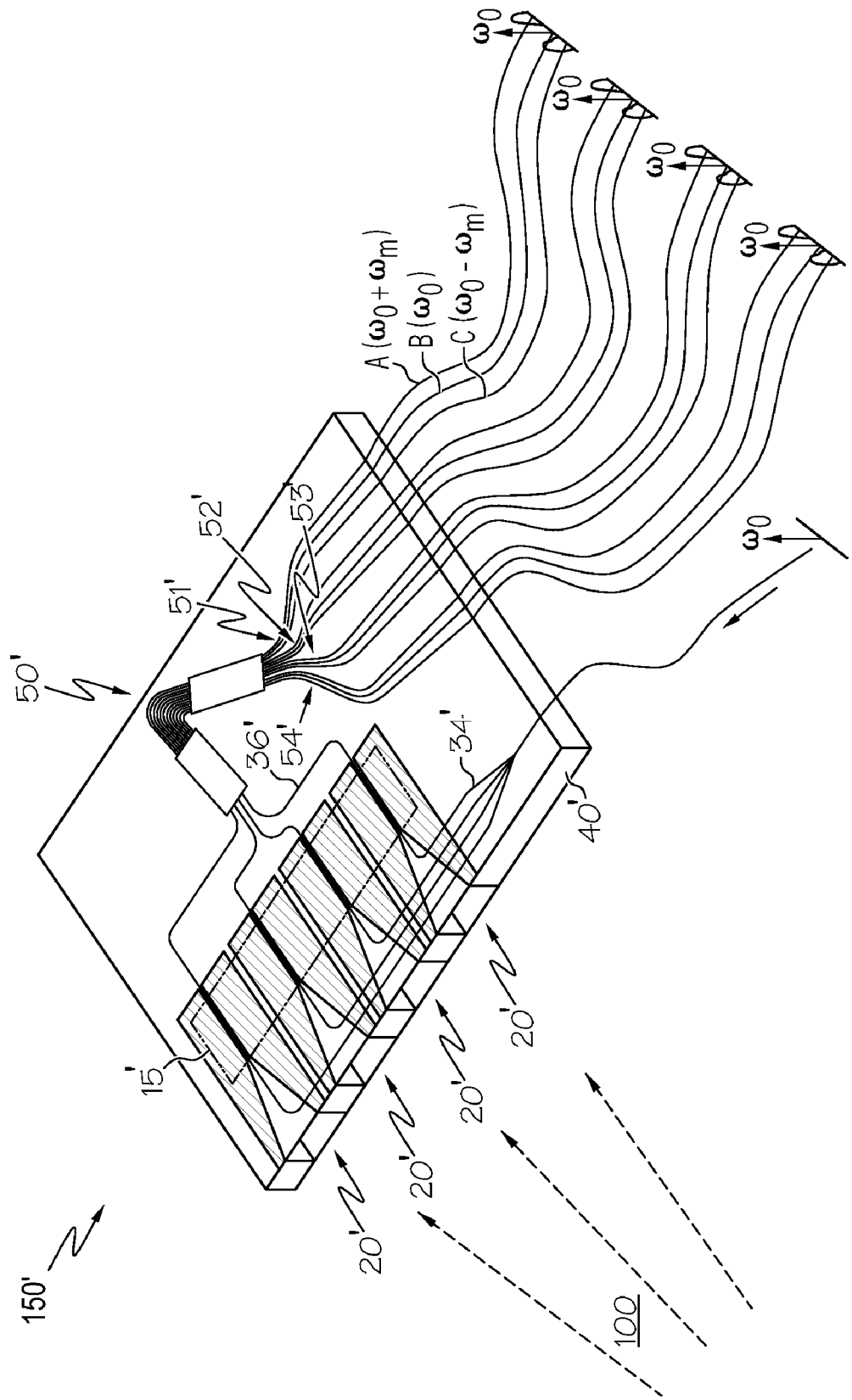
FIGS. 18 and 19 are schematic illustrations of antenna assemblies configured as one-dimensional and two-dimensional focal plane arrays, respectively.
Figure 19:
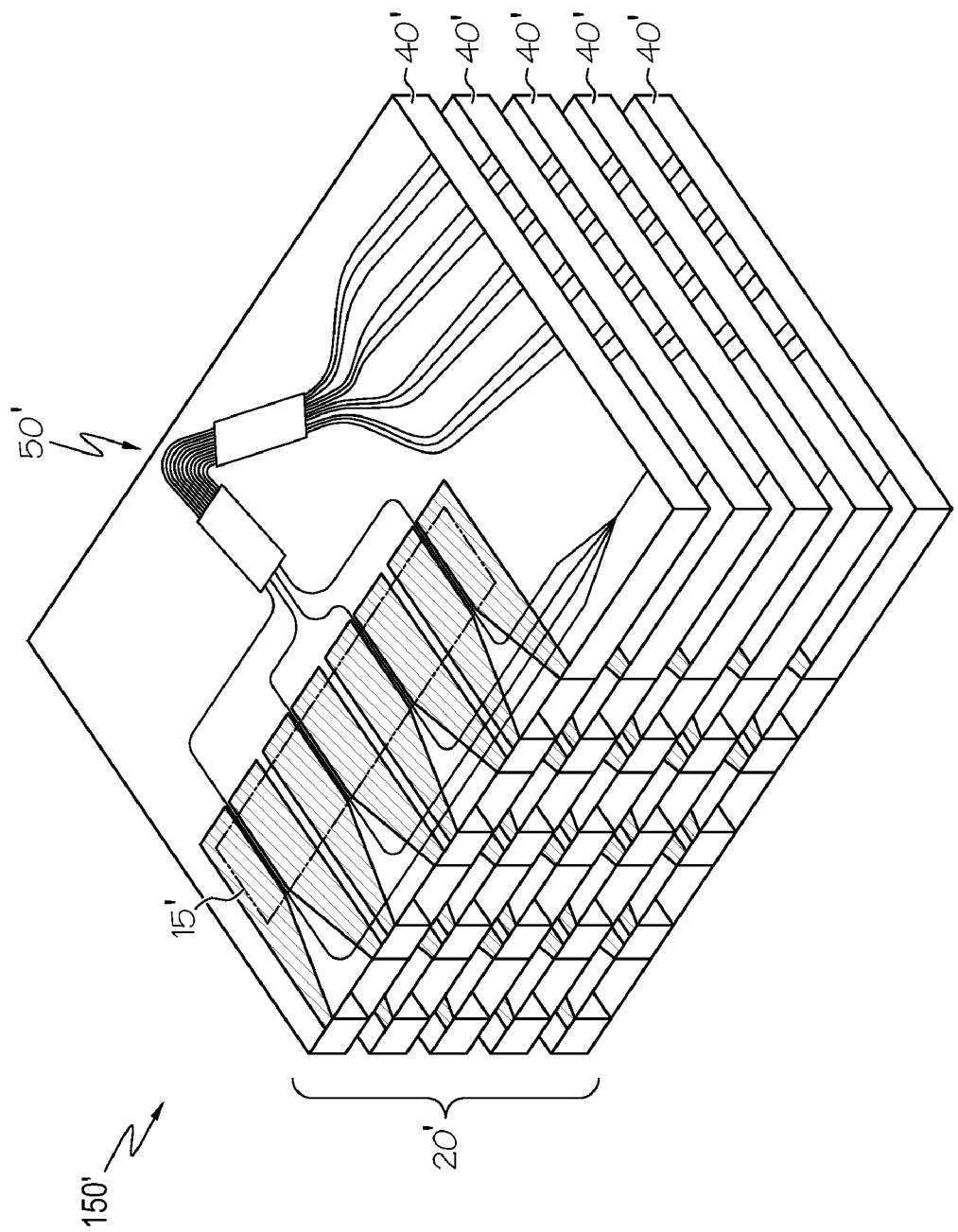

Turning now to FIGS. 18 and 19, a plurality of tapered slot antennae 20' and corresponding waveguide cores having respective input and output portions 34', 36' can be arranged on a common substrate 40'. For each tapered slot antennae 20', the optical signal at the optical output 36' of the waveguide core includes the carrier frequency band $\omega_0$, and the frequency sidebands $\omega_0 \pm \omega_m$. Each of these signals can be directed through a frequency dependent optical filter 50' to discriminate the frequency sidebands $\omega_0 \pm \omega_m$ from the carrier frequency band $\omega_0$, by separating the frequency sidebands $\omega_0 \pm \omega_m$ from the optical carrier $\omega_0$, and directing the sidebands $\omega_0 \pm \omega_m$ and the optical carrier $\omega_0$, to individual component outputs A, B, C of one of the filter output ports 51', 52', 53', 54'. Further waveguides, fibers, or other suitable optical propagation media are provided downstream of the filter output ports 51'-54' to direct the signals to a photodetector array or some other type of optical sensor.

FIGS. 18 and 19 also illustrate an embodiment of the present invention where the tapered slot antennae 20' are arranged in a one or two-dimensional focal plane array. In addition, the waveguide cores and the tapered slot antennae 20' can be configured as a parallel electrooptical circuit. In such a configuration, the output of the photodetector array can be used to analyze the MMW signal 100 in one or two dimensions because the respective output 36' of each sensor element within the photodetector array will be a function of the magnitude of the millimeter-wave voltage input to the modulator at a position corresponding to the sensor element defined by the corresponding antenna 20'. More specifically, as is illustrated in FIGS. 18 and 19, each of the tapered slot antennae 20' arranged in the array defines an antenna pixel within the focal plane array. As such, each antenna 20' receives a distinct pixel portion of a millimeter or sub-millimeter wave signal 100 incident on the focal plane array and the optical signals at the respective output portions 36' of each waveguide will provide a sensor output indicative of the one or two-dimensional distribution of the MMW signal 100.

In the case of the one-dimensional array illustrated in FIG. 18, it is noted that the one-dimensional array of tapered slot antennae 20' can be formed on a common substrate 40' and a twelve or more channel AWG 50', also formed on the common substrate 40', can be provided to filter the signals from all four antennae 20' simultaneously. FIG. 19 illustrates a similar embodiment of the present invention, with the exception that a plurality of the one-dimensional arrays illustrated in FIG. 18 are stacked to form a two-dimensional array of tapered slot antennae 20'. In the embodiment of FIG. 19, it is contemplated that a single AWG can be used for each one-dimensional grouping of antennae 20' or, if desired, a single AWG can be used to perform the filtering for the stacked antenna array.

Although FIGS. 18 and 19 schematically illustrate the use of an arrayed waveguide grating (AWG) as the optical filter 50', the optical filtering function of the illustrated embodiment can be accomplished using a variety of technologies including Bragg grating reflective filters, wavelength-selective Mach-Zehnder filters, multilayer thin film optical filters, micro ring resonator filters, and directional coupler filters that are wavelength selective. It is further contemplated that the embodiment illustrated in FIGS. 18 and 19 is also a viable alternative where lithium niobate or other non-polymeric electrooptic materials are utilized in forming the waveguide 32'.

An arrayed waveguide grating is particularly useful because it is an integrated optical device with multiple channels characterized by relatively narrow bandwidths. In operation, an AWG will take an input optical signal which has multiple frequencies, and will output N evenly spaced frequencies at different outputs. For example, an AWG with a channel spacing of 30 GHz or 60 GHz would be well-suited for a 120 GHz antenna system. The desired channel spacing of the AWG should be such that the frequency of the millimeter-wave is a multiple or close to a multiple of the AWG channel spacing.

Although the above discussion of the properties of AWGs focused on the use of a single input port of the AWG, an AWG with N output ports will often also have N input ports, each of which outputs light to all N output ports. For example, in the context of an 16×16 AWG (16 inputs×16 outputs), each of the 16 input ports has 16 evenly spaced wavelengths of light, with spacing of the light corresponding to the designed spacing of the AWG. If we then look at the output of a single port, we see that the optical output of the selected port also has the 16 individual wavelengths, but each wavelength from came from a different input port. Accordingly, as is illustrated in FIG. 18, if four distinct optical signals are output from four distinct optical outputs 36' corresponding to four distinct antennae 20, each of these outputs can include an optical carrier $\omega_0$, and two sidebands $\omega_0 \pm \omega_m$. If these four optical signals are then fed into four different input ports A of the AWG, the four optical carriers and their corresponding eight sidebands will exit from twelve different output ports of the AWG. Thus, a single AWG can be used to filter multiple input signals, as long as the number of input signals is less than the number of AWG ports divided by three (the number of distinct wavelength bands input at each port).

A second advantage to using an AWG as the optical filter is also described in FIG. 6. An AWG distinguishes both sidebands from its associated optical carrier. In contrast, a standard bandpass filter would remove the optical carrier and one of the sidebands. Further, if the two sidebands are coherent, which they are in this case, they can be recombined downstream of the AWG, leading to a 3 dB increase in the optical response over using just a single sideband.

It is noted that recitations herein of a component of the present invention being "configured" to embody a particular property, function in a particular manner, etc., are structural recitations, as opposed to recitations of intended use. More specifically, the references herein to the manner in which a component is "configured" denotes an existing physical condition of the component and, as such, is to be taken as a definite recitation of the structural characteristics of the component. For example, in the context of the present invention these structural characteristics may include the electrical & optical characteristics of the component or the geometry of the component.

It is noted that terms like "preferably," "commonly," and "typically," when utilized herein, should not be taken to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue. The term "substantially" is further utilized herein to represent a minimum degree to which a quantitative representation must vary from a stated reference to yield the recited functionality of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention. For example, although electrooptic functional regions according to specific embodiments of the present invention can be selected such that the variation of the index of refraction is dominated by an electrooptic response resulting from the Kerr Effect because Kerr Effect mediums can, in specific configurations, have the capacity for significantly higher changes in index of refraction than mediums dominated by the Pockels Effect, it is understood that electrooptic region may be dominated by the Pockels Effect, the Kerr Effect, or some other electrooptic effect.

It is noted that one or more of the following claims recites a portal "wherein the structure of the portal is such that at least the following conditions apply." For the purposes of defining the present invention, it is noted that this phrase is introduced in the claims as an open-ended transitional phrase that is used to introduce a recitation of a series of characteristics of the structure and should be interpreted in like manner as the more commonly used open-ended preamble term "comprising."

What is claimed is:

1. A millimeter or sub-millimeter wave portal system comprising an electrooptic source, a millimeter or sub-millimeter wave detector and a data analysis unit, wherein the structure of the portal is such that at least the following conditions apply:
    the electrooptic source comprises an optical signal generator, optical circuitry, and an optical/electrical converter;
    the optical signal generator is configured to generate a modulated optical signal characterized by a modulation frequency of at least about 30 GHz;
    the optical circuitry is configured to direct the modulated optical signal to the optical/electrical converter;
    the optical/electrical converter is configured to convert the modulated optical signal to a first millimeter or sub-millimeter wave having a first frequency and direct the first millimeter or sub-millimeter wave in the direction of an object positioned within a field-of-view defined by the millimeter or sub-millimeter wave detector;
    the millimeter or sub-millimeter wave detector is configured to convert reflections of the first millimeter or sub-millimeter wave from the object to first signals representing attenuation of the first millimeter or sub-millimeter wave upon reflection from the object;
    the optical/electrical converter is configured to convert the modulated optical signal to a second millimeter or sub-millimeter wave having a second frequency and direct the second millimeter or sub-millimeter wave in the direction of the object positioned within the field-of-view defined by the millimeter or sub-millimeter wave detector;
    the millimeter or sub-millimeter wave detector is configured to convert reflections of the second millimeter or sub-millimeter wave from the object to second signals representing attenuation of the second millimeter or sub-millimeter wave upon reflection from the object; and
    the data analysis unit transforms the first signals into an expected image of the object at the second frequency and the second signal into a measured image at the second frequency, and compares the expected image to the measured image to determine a deviation.

2. A system as claimed in claim 1 wherein the optical signal generator comprises an electrooptic sideband generator and an optical filter.

3. A system as claimed in claim 2 wherein:
    the electrooptic sideband generator is configured to generate frequency sidebands about a carrier frequency of an input optical signal; and
    the optical filter is configured to discriminate between the frequency sidebands and the carrier frequency.

4. A system as claimed in claim 3 wherein the optical signal generator further comprises optical circuitry configured to direct particular sidebands of interest to an optical output in the form of a millimeter wave optical signal.

5. A system as claimed in claim 2 wherein:
    the sideband generator is formed over a device substrate and is configured to generate frequency sidebands about a carrier frequency of the optical signal; and
    the optical filter is formed over the device substrate and is configured to discriminate between the frequency sidebands and the carrier frequency such that sidebands of interest can be directed to the optical output.

6. A system as claimed in claim 2 wherein the electrooptic sideband generator comprises an electrooptic interferometer and the optical filter comprises an arrayed waveguide grating.

7. A system as claimed in claim 6 wherein the optical circuitry is configured to combine selected optical outputs of the arrayed waveguide grating to create the modulated optical signal.

8. A system as claimed in claim 1 wherein the optical circuitry is configured to direct the modulated optical signal to a plurality of optical/electrical converters.

9. A system as claimed in claim 8 wherein the optical circuitry directs the modulated optical signal to a plurality of optical/electrical converters by splitting the modulated optical signal into a plurality of modulated outputs.

10. A system as claimed in claim 8 wherein the optical circuitry directs the modulated optical signal to a plurality of optical/electrical converters by redirecting the modulated optical signal sequentially from one optical/electrical converter to the next.

11. A system as claimed in claim 1 wherein the optical circuitry is configured to encode the modulated optical signal prior to direction to the optical/electrical converter.

12. A system as claimed in claim 1 wherein the detector comprises an antenna assembly comprising an antenna portion and an electrooptic waveguide portion.

13. A system as claimed in claim 12 wherein:
    the antenna portion comprises at least one tapered slot antenna; and
    the electrooptic waveguide portion comprises a waveguide core extending substantially parallel to a slotline of the tapered slot antenna in an active region of the antenna assembly.

14. A system as claimed in claim 12 wherein:
    the antenna portion comprises at least one tapered slot antenna;
    the waveguide portion comprises at least one electrooptic waveguide comprising a waveguide core in an active region of the antenna assembly; and
    the electrooptic waveguide at least partially comprises a velocity matching electrooptic polymer in the active region of the antenna assembly.

15. A system as claimed in claim 1 wherein:
    the millimeter or sub-millimeter wave portal system comprises a plurality of parallel portals; and each of the parallel portals comprises at least one dedicated optical/electrical converter fed by the optical signal generator.

16. A system as claimed in claim 1 wherein the millimeter or sub-millimeter wave portal system comprises at least one portal configured as a walk-through portal including at least one millimeter or sub-millimeter wave component and a supplemental detection component.

17. A millimeter or sub-millimeter wave portal system comprising an electrooptic source and a millimeter or sub-millimeter wave detector, wherein the structure of the portal is such that at least the following conditions apply:
the electrooptic source comprises an optical signal generator, optical circuitry, and an optical/electrical converter;
the optical signal generator is configured to generate a modulated optical signal characterized by a modulation frequency of at least about 30 GHz;
the optical circuitry is configured to direct the modulated optical signal to the optical/electrical converter;
the optical/electrical converter is configured to convert the modulated optical signal to a millimeter or sub-millimeter wave and direct the millimeter or sub-millimeter wave in the direction of an object positioned within a field-of-view defined by the millimeter or sub-millimeter wave detector; and
the millimeter or sub-millimeter wave detector is configured to convert reflections of the millimeter or sub-millimeter wave from the object to signals representing attenuation of the millimeter or sub-millimeter wave upon reflection from the object, wherein:
the optical signal generator comprises an electrooptic sideband generator and an optical filter;
the sideband generator comprises a phase modulator comprising an optical waveguide and a modulation controller configured to drive the sideband generator at a control voltage greater than or equal to about 2 times $V_\pi$ to generate frequency sidebands about a carrier frequency of the optical signal, where $V_\pi$ represents the voltage at which a $\pi$ phase shift is induced in the optical waveguide; and
the optical filter is configured to discriminate between the frequency sidebands and the carrier frequency such that sidebands of interest can be directed to the optical output of the optical signal generator.

18. A millimeter or sub-millimeter wave portal system comprising an electrooptic source and a millimeter or sub-millimeter wave detector, wherein the structure of the portal is such that at least the following conditions apply:
the electrooptic source comprises an optical signal generator, optical circuitry, and an optical/electrical converter;
the optical signal generator is configured to generate a modulated optical signal characterized by a modulation frequency of at least about 30 GHz;
the optical circuitry is configured to direct the modulated optical signal to the optical/electrical converter;
the optical/electrical converter is configured to convert the modulated optical signal to a millimeter or sub-millimeter wave and direct the millimeter or sub-millimeter wave in the direction of an object positioned within a field-of-view defined by the millimeter or sub-millimeter wave detector; and
the millimeter or sub-millimeter wave detector is configured to convert reflections of the millimeter or sub-millimeter wave from the object to signals representing attenuation of the millimeter or sub-millimeter wave upon reflection from the object, wherein:
the optical signal generator comprises a plurality of optical outputs characterized by distinct frequencies; and
the optical circuitry is configured to permit the selection and combination of different ones of the distinct-frequency optical outputs of the optical signal generator.

19. A system as claimed in claim 18 wherein the optical circuitry is configured to direct different combinations of the distinct-frequency optical outputs to a common optical/electrical converter.

20. A system as claimed in claim 18 wherein the optical circuitry is configured to direct different combinations of the distinct-frequency optical outputs to plurality of different optical/electrical converters.

21. A millimeter or sub-millimeter wave portal system comprising an electrooptic source and a millimeter or sub-millimeter wave detector, wherein the structure of the portal is such that at least the following conditions apply:
the electrooptic source comprises an optical signal generator, optical circuitry, and an optical/electrical converter;
the optical signal generator is configured to generate a modulated optical signal characterized by a modulation frequency of at least about 30 GHz;
the optical circuitry is configured to direct the modulated optical signal to the optical/electrical converter;
the optical/electrical converter is configured to convert the modulated optical signal to a millimeter or sub-millimeter wave and direct the millimeter or sub-millimeter wave in the direction of an object positioned within a field-of-view defined by the millimeter or sub-millimeter wave detector; and
the millimeter or sub-millimeter wave detector is configured to convert reflections of the millimeter or sub-millimeter wave from the object to signals representing attenuation of the millimeter or sub-millimeter wave upon reflection from the object, wherein:
the detector comprises an antenna assembly comprising an antenna portion and an electrooptic waveguide portion;
the antenna portion comprises at least one tapered slot antenna;
the electrooptic waveguide portion comprises a waveguide core extending substantially parallel to a slotline of the tapered slot antenna in an active region of the antenna assembly;
the electrooptic waveguide at least partially comprises a velocity matching electrooptic polymer in the active region of the antenna assembly;
a velocity $v_e$ of a millimeter or sub-millimeter wave signal traveling along the tapered slot antenna in the active region is at least partially a function of the dielectric constant of the velocity matching electrooptic polymer;
a velocity $v_O$ of an optical signal propagating along the waveguide in the active region is at least partially a function of the index of refraction of the velocity matching electrooptic polymer; and
the active region and the velocity matching electrooptic polymer are configured such that $v_e$ and $v_O$ satisfy the following relation:

$$\frac{|v_e - v_O|}{v_O} \leq 20\%.$$

22. A millimeter or sub-millimeter wave portal system comprising an electrooptic source and a millimeter or sub-millimeter wave detector, wherein the structure of the portal is such that at least the following conditions apply:

the electrooptic source comprises an optical signal generator, optical circuitry, and an optical/electrical converter;
the optical signal generator is configured to generate a modulated optical signal characterized by a modulation frequency of at least about 30 GHz;
the optical circuitry is configured to direct the modulated optical signal to the optical/electrical converter;
the optical/electrical converter is configured to convert the modulated optical signal to a millimeter or sub-millimeter wave and direct the millimeter or sub-millimeter wave in the direction of an object positioned within a field-of-view defined by the millimeter or sub-millimeter wave detector; and
the millimeter or sub-millimeter wave detector is configured to convert reflections of the millimeter or sub-millimeter wave from the object to signals representing attenuation of the millimeter or sub-millimeter wave upon reflection from the object, wherein:
the detector comprises an antenna assembly comprising an antenna portion and an electrooptic waveguide portion;
the antenna portion comprises at least one tapered slot antenna;
the waveguide portion comprises at least one electrooptic waveguide comprising a waveguide core in an active region of the antenna assembly;
the electrooptic waveguide at least partially comprises a velocity matching electrooptic polymer in the active region of the antenna assembly
a velocity $v_e$ of a millimeter or sub-millimeter wave signal traveling along the tapered slot antenna in the active region is at least partially a function of the dielectric constant of the electrooptic polymer;
a velocity $v_O$ of an optical signal propagating along the waveguide in the active region is at least partially a function of the index of refraction of the electrooptic polymer;
the tapered slot antenna comprises first and second electrically conductive elements arranged to define a radiating slot of the antenna;
the first electrically conductive element is arranged in a plane above the electrooptic waveguide; and
the second electrically conductive element is arranged in a plane below the electrooptic waveguide.

23. A millimeter or sub-millimeter wave portal system comprising an electrooptic source and a millimeter or sub-millimeter wave detector, wherein the structure of the portal is such that at least the following conditions apply:
the electrooptic source comprises an optical signal generator, optical circuitry, and an optical/electrical converter;
the optical signal generator is configured to generate a modulated optical signal characterized by a modulation frequency of at least about 30 GHz;
the optical circuitry is configured to direct the modulated optical signal to the optical/electrical converter;
the optical/electrical converter is configured to convert the modulated optical signal to a millimeter or sub-millimeter wave and direct the millimeter or sub-millimeter wave in the direction of an object positioned within a field-of-view defined by the millimeter or sub-millimeter wave detector; and
the millimeter or sub-millimeter wave detector is configured to convert reflections of the millimeter or sub-millimeter wave from the object to signals representing attenuation of the millimeter or sub-millimeter wave upon reflection from the object, wherein:

the detector comprises an antenna assembly comprising an antenna portion, a waveguide portion, and a frequency dependent filter;
the antenna portion comprises at least one tapered slot antenna;
the waveguide portion extends along at least a portion of an optical path between an optical input and an optical output of the antenna assembly;
the waveguide portion comprises a waveguide core in an active region of the antenna assembly;
the tapered slot antenna and the electrooptic waveguide are configured such that the millimeter or sub-millimeter wave signal traveling along the tapered slot antenna is imparted on the optical signal as frequency sidebands of an optical carrier frequency; and
the frequency-dependent filter comprises a plurality of filter output ports and is configured to discriminate the frequency sidebands from the carrier frequency band in an optical signal propagating along the waveguide portion, downstream of the active region such that frequency sidebands having wavelengths that are shorter and longer than a wavelength of the carrier band can be recombined at the optical output of the antenna assembly.

24. A millimeter or sub-millimeter wave portal system comprising an electrooptic source and a millimeter or sub-millimeter wave detector, wherein the structure of the portal is such that at least the following conditions apply:
the electrooptic source comprises an optical signal generator, optical circuitry, and an optical/electrical converter;
the optical signal generator is configured to generate a modulated optical signal characterized by a modulation frequency of at least about 30 GHz;
the optical signal generator comprises an electrooptic sideband generator configured as an electrooptic interferometer to generate frequency sidebands about a carrier frequency of an input optical signal and an optical filter configured as an arrayed waveguide grating to discriminate between the frequency sidebands and the carrier frequency at a plurality of optical outputs characterized by distinct frequencies;
the optical signal generator further comprises optical circuitry configured to combine selected optical outputs of the arrayed waveguide grating to create the modulated optical signal and direct particular sidebands of interest to a common optical/electrical converter or a plurality of different optical/electrical converters in the form of a modulated millimeter wave optical signal;
the optical circuitry is configured to direct the modulated optical signal to the optical/electrical converters by splitting the modulated optical signal into a plurality of modulated outputs or redirecting the modulated optical signal sequentially from one optical/electrical converter to the next;
the optical/electrical converter is configured to convert the modulated optical signal to a millimeter or sub-millimeter wave and direct the millimeter or sub-millimeter wave in the direction of an object positioned within a field-of-view defined by the millimeter or sub-millimeter wave detector;
the millimeter or sub-millimeter wave detector comprises an antenna assembly comprising an antenna portion and an electrooptic waveguide portion and is configured to convert reflections of the millimeter or sub-millimeter wave from the object to signals representing attenuation of the millimeter or sub-millimeter wave upon reflection from the object;

the antenna portion of the antenna assembly comprises at least one tapered slot antenna and the waveguide portion of the antenna assembly comprises at least one electrooptic waveguide comprising a waveguide core in an active region of the antenna assembly; and the electrooptic waveguide at least partially comprises a velocity matching electrooptic polymer in the active region of the antenna assembly.

* * * * *